United States Patent
Nishizawa et al.

(10) Patent No.: US 6,496,756 B1
(45) Date of Patent: Dec. 17, 2002

(54) MASTER-SLAVE MANIPULATOR APPARATUS AND METHOD THEREFOR, FURTHER TRAINING APPARATUS FOR MANIPULATOR OPERATION INPUT AND METHOD THEREFOR

(75) Inventors: Kouji Nishizawa, Tsuchiura (JP);
Kazutoshi Kan, Niihari-gun (JP);
Masakatsu Fujie, Ushiku (JP)

(73) Assignee: Technology Research Association of Medical and Welfare Apparatus, Tokyo (JP)

( * ) Notice: Subject to any disclaimer, the term of this patent is extended or adjusted under 35 U.S.C. 154(b) by 0 days.

(21) Appl. No.: 09/441,053

(22) Filed: Nov. 16, 1999

(30) Foreign Application Priority Data

Nov. 16, 1998 (JP) ............................................ 10-325470

(51) Int. Cl.⁷ ......................... G05B 15/00; G05B 19/00
(52) U.S. Cl. ........................... 700/264; 700/3; 700/260; 700/85; 700/47
(58) Field of Search ................................. 700/3, 47, 85, 700/260, 262, 257, 264; 318/568.11

(56) References Cited

U.S. PATENT DOCUMENTS

| | | | | |
|---|---|---|---|---|
| 4,661,032 A | * | 4/1987 | Arai ...................... | 318/568.19 |
| 4,950,116 A | | 8/1990 | Nishida .......................... | 414/5 |
| 5,600,759 A | * | 2/1997 | Karakama .............. | 318/568.13 |
| 5,876,325 A | | 3/1999 | Mizuno et al. ............. | 600/102 |
| 6,144,884 A | * | 11/2000 | Niemeyer et al. ...... | 318/568.11 |
| 6,212,443 B1 | * | 4/2001 | Nagata et al. ......... | 318/568.13 |
| 6,236,953 B1 | * | 5/2001 | Segal ........................ | 702/127 |
| 6,272,396 B1 | * | 8/2001 | Taitler ................... | 318/568.13 |

FOREIGN PATENT DOCUMENTS

| | | | | |
|---|---|---|---|---|
| JP | 60-29292 | 2/1985 | .......... | B25J/013/08 |
| JP | 2292193 | 12/1990 | | |
| JP | 7124165 | 5/1995 | | |
| JP | 2000084871 A | * | 3/2000 | .............. B25J/3/00 |
| SU | 949629 B | * | 8/1982 | ............ B25J/13/00 |

OTHER PUBLICATIONS

Sato et al., "Active Understanding of Human Intention by a Robot through Monitoring of Human Behavior", Sep. 1994, IEEE Intern. Conference on Intelligent Robots and Systems '94, 'Advanced Robotic Systems and the Real World', IROS '94, vol. 1, pp. 405–414.*

Ikeura et al., "Manual Control Approach to the Teaching of a Robot Task", Sep. 1994, IEEE Transactions on Systems, Man, and Cybernetics, vol. 24, No. 9, pp. 1339–1346.*

Asada et al., "Skill Acquisition from Human Experts through Pattern Processing of Teaching Data", 1989, IEEE International Conference on Robotics and Automation, pp. 1302–1307.*

* cited by examiner

*Primary Examiner*—Thomas Black
*Assistant Examiner*—Crystal J. Barnes
(74) *Attorney, Agent, or Firm*—Antonelli, Terry, Stout & Kraus, LLP

(57) ABSTRACT

A master-slave manipulator apparatus and a control method therefor, in which a movement which an operator does not intend is prevented, thereby reflecting the operator's intention accurately and correctly, includes a master manipulator for conducting an operation input therewith, a controller for processing the operation input, and a slave manipulator for operating upon drive instruction from the controller, wherein the master manipulator includes a plurality of force detectors, and the controller decides a driver shaft, by comparing an output from a pattern producing means for producing a generation pattern of the outputs of the plurality of force detectors to a pattern stored in a memory means in advance, thereby removing the operation input which is caused unconsciously in the operation input of the master manipulator.

20 Claims, 14 Drawing Sheets

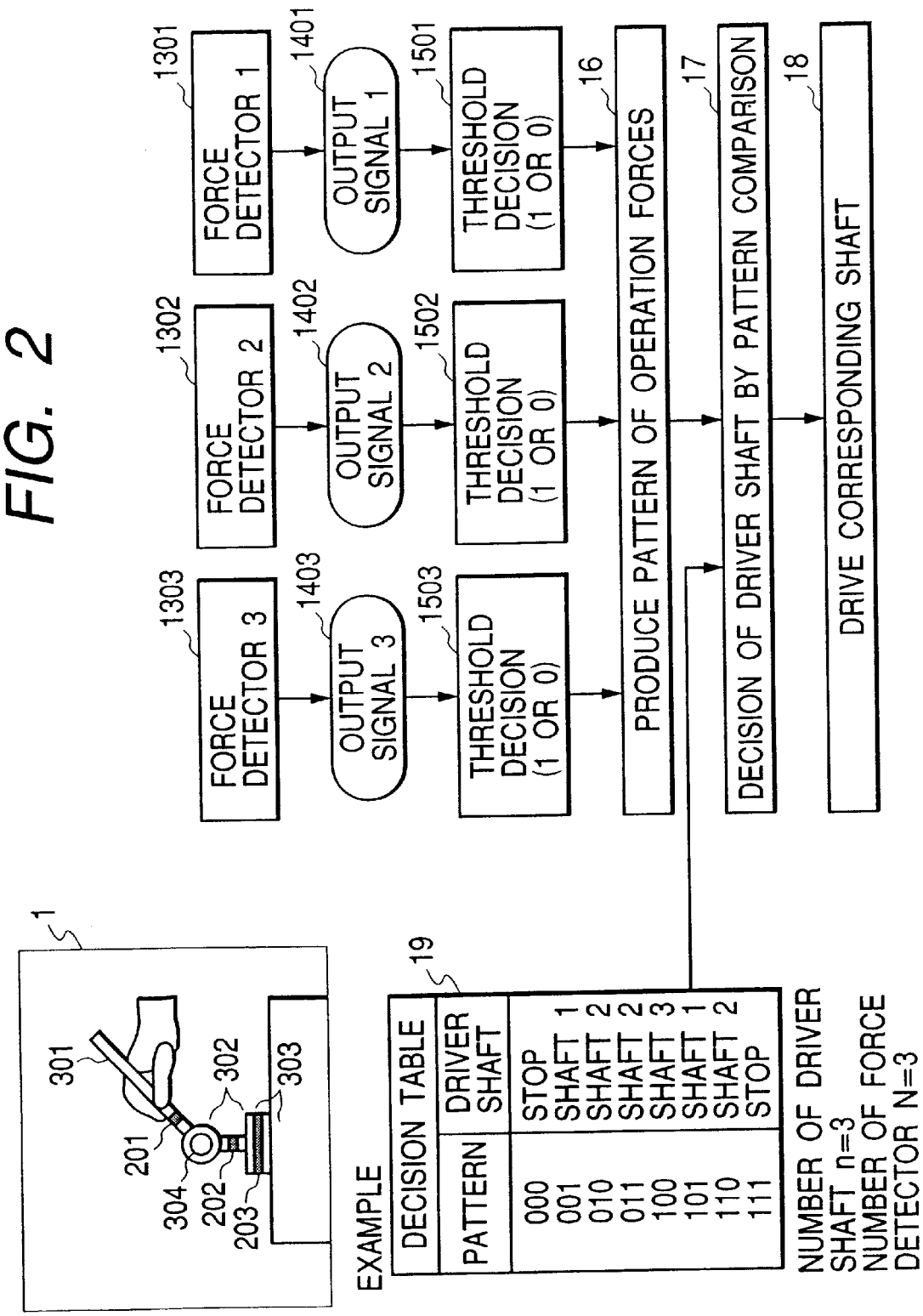

FIG. 7

```
START
  ↓
END OF TRAINING    — 45
  ↓
CALCULATE EXCESSIVE FORCE DIRECTION
AND GENERATION RATE THEREOF IN     — 46
TRAINING FOR EACH DRIVER SHAFT
  ↓
DISPLAY EXCESSIVE FORCE DIRECTION
AND GENERATION RATE THEREOF IN
TRAINING FOR ALL DRIVER SHAFTS ON  — 47
SCREEN
  ↓
END
```

FIG. 11

EXAMPLE OF DECISION TABLE  63

| p   | C[p] ( R[j] [p] ) | CLASSIFICATION |
|-----|-------------------|----------------|
| 000 | STOP              | 3              |
| 001 | 1 (50)            | 1              |
| 010 | 2 (40)            | 1              |
| 011 | 2 (30)            | 1              |
| 100 | 3 (45)            | 1              |
| 101 | 1 (45), 3 (20)    | 2              |
| 110 | 2 (30), 3 (25)    | 2              |
| 111 | STOP              | 3              |

MASTER-SLAVE MANIPULATOR APPARATUS AND METHOD THEREFOR, FURTHER TRAINING APPARATUS FOR MANIPULATOR OPERATION INPUT AND METHOD THEREFOR

BACKGROUND OF THE INVENTION

1. Field of the Invention

The present invention relates to a master-slave manipulator apparatus for operating a slave manipulator upon the basis of instructions from a master manipulator and a method therefor, and further relates to a training apparatus for manipulator operation input and a method therefor.

2. Description of Prior Art

Conventionally, with so-called a master-slave manipulator of a type being driven responding to a force inputted from a manipulator, the master manipulator (however, in the explanation given hereinafter, this "master manipulator" will be called by only "master") drives a slave manipulator (hereinafter, this "slave manipulator" will be called by "slave") accurately with respect to the forces being operated thereto, thereby aiming to operate it freely without a feeling that something wrong. For that purpose, threshold values for driving the driver shafts of the master manipulator are set for each degree of freedom of the driver shaft, so as to decide the force inputs given to the master manipulator. In this case, however, this threshold value is set at a magnitude so that the application of the inputs can be decided or detected fully, with certainty, by expecting or estimating a safety factor therein, etc.

On a while, in cases where, for example, a tired or exhausted operator operates or manipulates under the condition of lucking her/his concentration thereto, and/or where she/he operates it while seeing the operation condition of the slave looking aside the master, and/or where a person not well-skilled or trained in operation tries to manipulate it, the operating inputs are made as if ignoring or denying the degree of freedom of the master, or an operator applies a force into a direction not intended, of unconsciousness, therefore, there can be occur a phenomenon that a movement which the operator does not intend occurs in the slave.

Further, even when trying to perform or make the same operation, there may be a case where the forces differ delicately, for each individual, in the manners of applying thereof, for example, depending on the difference in the dominant arm and/or habits during manipulation by the operators. Therefore, if applying a setup value(s) (i.e., a threshold(s)) being similar for all the operators, there may be caused a case where the will of the operator cannot be sufficiently reflected in the operation. In particular, in a case where the same master is commonly owned or used by a plurality of operators, or the like, if the set values of the master are fixed, some operator(s) cannot reflect her/his will in the operation input.

By the way, in such the master-slave manipulator system, as a measure for not only following the inputting operation by the operator, but also against the input not intended by the operator, as was already known in Japanese Patent Laying-Open No. Hei 7-124165 (1995), there is proposed a manipulator system, wherein an acting point of the slave is calculated upon the basis of the sight line(s) of the operator, and further the positional difference thereof from the acting point indicated by an operation input means is obtained, thereby driving and controlling the slave so that the position of the acting point comes to be that acting point which the operation input means indicates, only when the positional difference is smaller than a predetermined value.

With such the manipulator system, namely under the environment where the slave is operated, in particular, in cases where there is an object around which should be escaped an external force from being applied to, and/or where the external force should be escaped from being applied to the environment itself around the object, i.e., in a scene where the will of the operator must be transmitted to the slave with accuracy or correctly, it is very dangerous that the slave makes a movement which is not intended by the operator, or that it takes a position not to be intended. Also, in particular, in a case where detailed and minute work is required by using the slave within a narrow space, there are often cases where no mistake will be allowed in the operation direction thereof.

On a while, in a case where trying to move the master, being restricted in the degree of freedom within the three dimensional space, into a certain direction thereof, a human, i.e., the operator may sometimes make an operation input so that the master is driven in a plurality directions of the degree of freedom at one time, not so far as she/he does not grasps the directions of the degree of freedom, in which the master can move completely, and is not always in her/his mind the direction thereof. Also, even if the operator tries to drive the master in only a certain degree of freedom, however she/he may also generate a force in the direction other than that of the degree of freedom at the same time in unconsciousness. For the human as the operator, it is rather difficult to move her/his hand only in one direction of the degree of freedom within such the three dimension space.

In this manner, according to the conventional art(s), there sometimes occurs the cases, where the slave comes to be in a position that the operator does not intend, since the operator occasionally drives the master into the plural directions of degree of freedom at the same time, or where the slave performs a movement that the operator does not intend by forces being generated unconsciously. Namely, it comes to be a problem whether the force(s) inputted through the master reflects the intention of the operator correctly and accurately or not. In other words, according to the conventional art(s) mentioned above, there may occur the case where the master manipulator also responds to the force(s) not intended by the operator, correctly and accurately, even when is inputted thereto the force, though it is not intended by her/him.

For such the problems, as described in the conventional art(s)mentioned above, in the case where the threshold values are set for the directions of the degree of freedom for the driver shaft of the master, respectively, so as to recognize the input thereof during the operation, it may be possible for the operator to input operation(s) reflecting the intention of her/himself correctly and accurately, if she/he could grasp the directions of degree of freedom of the master and also could make only an input along with that of the degree of freedom intended by her/him. But, such the operation necessitates a concentration of attentions by the operator. However, it is impossible for the operator to keep such the operation condition, necessitating such the concentration of attentions, for a long time.

For example, in the operation while seeing or looking at the working objet, or in the operation under condition of making her/his eyes off from the master, or in the operation under the operation where the tiredness is accumulated so that the concentration is lost, or in the operation that the person who is not well-skilled or trained performs, an easy operation is likely to be conducted by imaging the movement of the slave intuitively, and in such the instance, since the operation is conducted by neglecting or denying the directions of degree of freedom, in which the master can drive, strong forces come to be operated in plural directions of degree of freedom. In particular, in a case where the above-mentioned threshold values for recognizing the presence of the input from the master are set to be relatively low, so as to make it operable with a light force, it is further difficult to separate the force, acting in such the unconsciousness to the master, from that in the direction intended by the operator. In such the case, even if a large threshold value, being recognizable only the input which the operator intends, is set for each direction of the degree of freedom for the master, there also may occur a case where the large force is inputted in the driver shaft (the degree of freedom) other than that on which the operator intends to. In such the case, also the slave comes to make a movement which the operator does not intend.

By the way, in the manipulator control system known from the Japanese Patent Laying-Open No. Hei 7-124165 (1995) mentioned above, the direction which the operator intends to is defined by means of the sight lines of the operator, however, in the case where the positional difference, between the acting point calculated out on the basis of this sight lines and that which the master indicates, is within an allowable range, also the above-mentioned separation between the operation input which the operator intends and that not intended is not conducted. Then, other than the operation input which the operator intends to, but even the operation input which is not intended is also taken into consideration, therefore the slave performs also such the movement that the operator does not intend to. Also, according to the conventional art mentioned above, in particular in the operation being extended for a long time, it is difficult to indicate the acting point always by the sight line, therefore the degree of tiredness comes to be harder than that of an ordinary operation, and in this sense, it may comes to be a cause of loosing the concentration, and it is rather dangerous to perform such the detail and minute operations by the manipulator under such the condition.

SUMMARY OF THE INVENTION

Therefore, an object according to the present invention, by taking the problems in the conventional arts mentioned above into the consideration, is namely to provide a master-slave manipulator apparatus and a control method therefor, wherein the slave will not perform such a movement that the operator does not intend in spite of the force being applied by the operator in unconsciousness, thereby reflecting the operator's intention thereon correctly and/or accurately, and to provide further a training apparatus and a method therefor for training the operation input for such the master-slave manipulator apparatus as mentioned.

For achieving the object mentioned above, according to the present invention, first there is provided a master-slave manipulator apparatus, comprising:

a master manipulator for performing an operation input;

a controller for processing the operation input from said master manipulator; and a slave manipulator operating upon basis of a drive instruction from said controller, wherein said master manipulator comprises:

a plurality of force detector means for detecting the operation input, and said controller comprises means comprises:

means for removing the operation input which is generated unconsciously in inputting the operation input to said master manipulator, upon basis of outputs from said plurality of force detector means.

Also, according to the present invention, there is provided the master-slave manipulator apparatus as defined in the above, wherein said unconscious operation input removing means comprises:

means for producing a generation pattern of the outputs from the plurality of force detector means of said master manipulator; and further means for outputting the drive instruction at least to said slave manipulator, being removed from the operation input which is generated unconsciously, upon basis of the generation pattern of the outputs from the force detector means produced by said means.

Also, according to the present invention, there is further provided the master-slave manipulator apparatus as defined in the above, wherein said unconscious operation input removing means further comprises at least means for deciding a driver shaft in said slave manipulator, upon basis of the generation pattern of the outputs from the force detector means produced by said means.

Further, according to the present invention, there is provided the master-slave manipulator apparatus as defined in the above, wherein said decision means further comprises:

a memory means for memorizing a generation pattern of the outputs from said plurality of force detector means therein in advance; and a comparing means, wherein at least the driver shaft in said slave manipulator is decided through said comparing means, by comparing the generation pattern of the outputs from said plurality of force detector means with the generation pattern which is stored in said memory means.

Also, according to the present invention, there is provided the master-slave manipulator apparatus as defined in the above, wherein said generation pattern producing means further comprises means for simplifying the outputs from said plurality of force detector means.

Further, according to the present invention, there is provided the master-slave manipulator apparatus as defined in the above, wherein said decision means further comprises means for collecting the generation pattern of the outputs from said plurality of force detector means corresponding to the driver shaft specified, so as to store it into said memory means.

And, according to the present invention, there is provided the master-slave manipulator apparatus as defined in the above, wherein said decision means further comprises means for identify of the operator, and said comparison means compares the generation pattern stored in said memory means to the generation pattern of the outputs from said plurality of force detector means, corresponding to an output of said identification means.

In addition thereto, according to the present invention, there is provided the master-slave manipulator apparatus as defined in the above, further comprising a plurality of means for detecting muscle potentials from an arm of the operator operating said master manipulator, wherein said controller comprises means for removing an inputting operation being generated unconsciously in the operation input of said master manipulator, upon basis of the outputs of said plurality of force detector means, and the outputs from said plurality of muscle potential detecting means as well.

Next, according to the present invention, also for achieving the object mentioned above, there is provided a control method for a master-slave manipulator apparatus, wherein a slave manipulator is driven and controlled corresponding to an operation input from a master manipulator, and said master manipulator comprises a plurality of force detector means, comprising following steps of:

detecting forces being applied onto said master manipulator by means of said plurality of force detector means;

producing a generation pattern of the plural forces applied to the master manipulator, being detected in said step; and removing operation input applied unconsciously onto said master manipulator, upon basis of said generation pattern being produces.

Also, according to the present invention, there is provided the control method for a master-slave manipulator apparatus as defined in the above, wherein at least said operation input applied unconsciously is removed therefrom, by deciding the driver shaft in said slave manipulator, upon basis of said generation pattern produced.

And, according to the present invention, there is provided the control method for a master-slave manipulator apparatus as defined in the above, wherein at least the driver shaft in said slave manipulator is decided, by comparing the generation pattern produced with a pattern produced in advance.

Further, according to the present invention, there is provided the control method for a master-slave manipulator apparatus as defined in the claim 11, wherein the comparison with the pattern produced in advance is conducted after simplifying the generation pattern produced.

And, according to the present invention, there is also provided the control method for a master-slave manipulator apparatus as defined in the above, wherein there are further provided a plurality of means for detecting muscle potentials from an arm of an operator operating said master manipulator, and the operation input applied to said master manipulator unconsciously is removed by using also outputs from said plurality of the muscle potential detector means, when excluding the operation input applied to said master manipulator unconsciously.

Further, according to the present invention, also for achieving the object mentioned above, there is provided a apparatus for making a training of operating a master-slave manipulator apparatus, wherein a slave manipulator is driven and controlled corresponding to an operation input from a master manipulator, comprising:

a controller for processing the operation input from said master manipulator, wherein said master manipulator forming a training apparatus for operation input of the manipulator, comprises:

a plurality of force detector means for detecting said operation input, and wherein said controller comprises, means for deciding presence of the operation input being applied by an operator unconsciously in the operation input of said master manipulator, upon basis of outputs from said plurality of force detector means, wherein the training of the master-slave manipulator apparatus is conducted upon basis of the presence of the unconscious operation input which is decided by means of said decision means.

Further, according to the present invention, there is provided the apparatus for making a training of operating a master-slave manipulator apparatus as defined in the above, further comprising means for generating an alarm depending on a result of decision by means of said decision means of the unconscious input operation.

Also, according to the present invention, there is provided the apparatus for making a training of operating a master-slave manipulator apparatus as defined in the above, further comprising a display means for displaying a result of decision by means of said decision means of the unconscious input operation.

And, according to the present invention, there is also provided the apparatus for making a training of operating a master-slave manipulator apparatus, as defined in the above, further comprising an identifying means of the operator.

Moreover, according to the present invention, also for achieving the object mentioned above, there is provided a method for making a training of operating a master-slave manipulator apparatus, wherein a slave manipulator is driven and controlled corresponding to an operation input from a master manipulator, and said master manipulator comprises a plurality of force detector means for detecting the operation input, comprising following steps of:

detecting forces applied onto said master manipulator by means of said plurality of force detector means;

producing a generation pattern of the plural forces applied onto the master manipulator, which are detected in the above step;

deciding a presence of an operation input being applied unconsciously by an operator in the operation input of said master manipulator; and conducting the training for the operation input of the manipulator upon basis of the existence of the unconscious operation input by the operator, which is decided.

Further, according to the present invention, there is provided the method for making a training of operating a master-slave manipulator apparatus as defined in the above, further comprising a step of alarming the operator, upon basis of the existence of the unconscious operation input by the operator, which is decided.

Also, according to the present invention, there is provided the method for making a training of operating a master-slave manipulator apparatus as defined in the above, further comprising a step of displaying a result of the decision, upon basis of the existence of the unconscious operation input by the operator, which is decided.

Furthermore, the master manipulator (or only, the master), mentioned in the present specification, means or indicates an apparatus for operating instructions to the slave manipulator (or only, the slave) with degree of freedom being equal or more than three (3).

While, the slave manipulator (or only, the slave), mentioned in the present specification, means or indicates an apparatus, being driven upon the basis of the instructions from a controller processing information inputted into the master manipulator (or only, the master). Also, it includes a simulator for simulating movement of the slave, or similarly the display on a screen indicating the movement of the slave.

Further, the operation forces mentioned in the present specification means forces in three directions in a special coordinates system and torque in the respective directions thereof.

Namely, when a human, an operator conducts the operation input by using the master, a combination of the output results from the plural force detector means in a certain time period is expressed by a pattern. In this pattern are included not only the force inputted by the operator in consciousness, but also the force which is applied unconsciously in many cases. Then, according to the present invention, since there exists the direction of force being applied unconsciously other than the force in a direction of operation being intended, form view of the direction in which the master is operated, the directions in which a human can apply force with ease and with difficulty, and the directions in which the operation can be made with ease and with difficulty, etc., therefore it is possible to arrange or classify the operation inputs when trying to drive the corresponding driver shaft into a several patterns in advance. Then, from the pattern of this operation forces, the direction of force being applied unconsciously and the direction of force being inputted intentionally are decided by comparing thereof, and the driver shaft of the master is driven upon the result thereof.

However, as will be shown in embodiments which will be mentioned in details hereinafter, so as to meet with an individual habit of the operator, it is so constructed that a difference in way of applying forces by her/his dominant arm, etc., patterns of operation forces when driving the master in the respective degree of freedom (i.e., the driver shafts) are collected for each of the individuals, and a relationship between the pattern of operation force being calculated upon the basis thereof and the driver shaft can be recorded as a decision table being for exclusive use by the individual. Also, it is so constructed that, by conducting the identification of the operator before operation, the decision of the driver shaft is conducted by using the above-mentioned decision table of the operator her/himself, being registered.

BRIEF DESCRIPTION OF THE DRAWINGS

FIG. 2 is a chart for showing one example of flows for patterning process in the master-slave manipulator apparatus, according to the present invention;

FIG. 7 is a control flow chart for showing the details of the processes before completion thereof in the above-mentioned training apparatus for manipulator input;

FIG. 11 a view for showing an example of the decision table produced by using the control flows shown in the FIGS. 8, 9 and 10 mentioned above;

DETAILED DESCRIPTION OF PREFERRED EMBODIMENT(S)

Hereinafter, embodiments according to the present invention will be fully explained by referring to the attached drawings.

Figure 1:
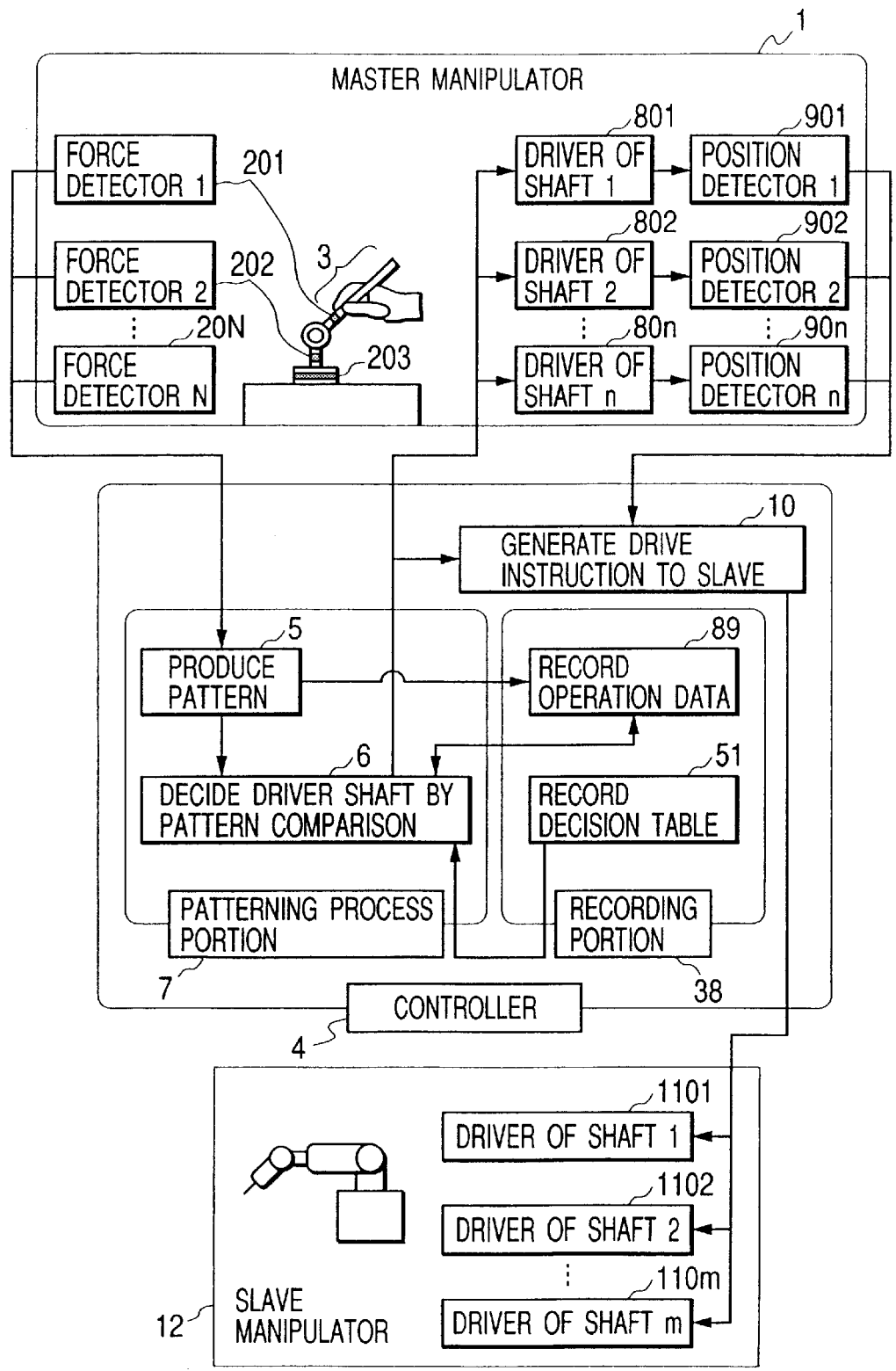
FIG. 1 is a view of the system configuration for showing an outline of a master-slave manipulator apparatus, according to an embodiment of the present invention.

First, in FIG. 1, there is shown a master-slave manipulator apparatus according to a first embodiment of the present invention. In the figure, a master manipulator (master) 1 comprises an operation or manipulation portion 3 through which operation is inputted by an operator, a plurality of force detector means 201, 202 . . . 20N, driver means (i.e., driver means of shaft 1 to shaft n) 801, 802 . . . 80n for driving the driver shafts of the master in each degree of freedom, and position detector means (1 to n) 901, 902 . . . 90n for detecting a shifting or moving amount in each degree of freedom of the driver shafts of the master.

Also, a controller 4 for providing a drive instruction to a slave in accordance with a direction or indication on operation which is inputted into the master 1 mentioned above, comprises: a pattern generating means 5 for generating a pattern by a combination of the output results from the force detector means 201, 202 . . . 20N mentioned above; a decision table recording means 51 for recording relationships, each between the pattern being generated and the driver shaft (i.e., a decision table) therein; a driver shaft decision means 6 for deciding or judging the driver shaft to be driven, by comparing the pattern being generated in the above with a pattern which is recorded previously in a recording portion 38; a drive instruction generating means 10 for generating the drive instruction to the slave upon the basis of the shifting amount in each degree of freedom of the driver shafts of the master, being driven, depending upon the result of decision made by means of the driver shaft decision means 6; and an operation data recording means 89 for recording at least a number of times of interruptions counted up from a start of control, the patterns produced and the driver shaft being driven, as data for the controls which are executed by periodical interruption processes. Further, as is apparent from the figure, a so-called a pattering process portion 7 is constructed by means of the pattern generating means 5 mentioned above and the driver shaft decision means 6 by pattern comparison, and the recording portion 38 mentioned above is constructed by the above decision table recording means 51 and the operation data recording means 89.

Also, the slave manipulator (i.e., the slave) 12 has drive means (drive means of shaft 1 to shaft m) 1101, 1102 . . . 110m for driving each shaft of the slave within the respective degree of freedom thereof.

With the construction mentioned in the above, in the above 30 master 1, each output of the force detector means 201, 202 . . . 20N varies or changes depending on the drive force which is inputted thereto. The outputs from those plural force detector means 201, 202 . . . 20N are inputted into the patterning process portion 7 of the above controller 4, thereby generating the patterns of the forces which are operated and inputted. However, each pattern of forces generated by the patterning process portion 7 is composed of a combination of the output results which are detected by the above force detector means 201, 202 . . . 20N at a time (or instance).

The recording portion 38 of the above controller 4 records the relationships in advance, each being between the pattern of forces which are operated and inputted and the driver shaft corresponding to said pattern. The records of the relationships are called as a decision table. And, the pattern of the operation input which is generated by means of this pattern generating means 5, and the above pattern which is recorded in advance, are compared by means of the above-mentioned driver shaft decision means indicated by the block 6, so as to decide the shaft to be driven (i.e., the degree of freedom of the driver shaft). However, at least the pattern generated, the driver shaft decided, and the number of the interruptions are recorded in the above-mentioned operation data recording means 89 as the operation data thereof. And the example of use of the recorded data will be explained in FIGS. 12 and 13 which will be mentioned later.

Namely, the master 1 drives the driver shaft(s) which is decided by the driver shaft decision means 6 with pattern comparison in the above controller 4, through the above drive means 801, 802 . . . 80n, and further detects the positional shifting of the driver shafts by the above position detector means 901, 902 . . . 90n. And in the drive instruction generating means 10 to the slave, of the controller 4, at least information of the shaft(s) of the slave to be driven and information which are detected by the position detector means 901, 902 . . . 90n are outputted as the drive instruction to the slave 12. And the salve 12 operates or drives the corresponding driver shaft(s) upon the basis of the instruction from the above controller 4, by means of the driver means 1101, 1102 . . . 110m.

Further, the pattern of operation force, being inputted in this instance, means a combination of informations, such as a several number of integers, etc., by simplifying the outputs of the force detectors 201, 202 . . . 20N, which are generated by the operation input being applied to the driver shaft(s) of the master 1 through a predetermined method. However, the simplification mentioned here means processes, such as, a process of converting them into binary values, i.e., "0" and "1", with a decision of using a threshold value(s), for example, a process of converting them into trinary values, i.e., "0", "+1" and "−1", by also taking the polarity of the outputs into the consideration, and a process of converting the magnitude of forces detected by each of the force detectors 201, 202 . . . 20N, being inputted at that time (or instance), into a ratio with respect to a resultant force of them, and further it is needless to say that the one can be used, which is considered be the most suitable therefor, depending upon the structure of the master 1 and the contents of operation being applied with the control.

In this manner, with the manipulator of the construction mentioned above, it is possible to remove the force, being applied unconsciously by the operator, from the operation input, in which it is mixed or mingled together with the force being applied intentionally, by comparing it to the pattern which is recorded in advance as the pattern thereof. Further, since it is possible to remove the information of the force being applied unconsciously by the operator, it is also possible to reflect the intention of the operator, correctly or accurately much more.

Also with the manipulator of the construction mentioned above, in which the control is performed by taking the unconscious force into account from beginning, there is no necessity of making the threshold value for each of the driver shafts large unnecessarily, as practiced in the conventional art, for removing such the unconscious force, therefore it becomes possible to operate the master with the operation input of small force. Namely, the unnecessary force is not needed to be applied, and the master can be operated with ease. And, from those facts, it is possible to operate with paying concentration onto the work of the slave, but not onto the operation of the master itself, and it is possible to lighten or reduce the degree of tiredness of the operator due to such the operation for a long time, and to increase an operability and a safety thereof, as well.

Next, by referring to FIGS. 2 and 3 attached herewith, an actual example of the patterning process in the above patterning process portion 7 of the controller 4, as the gist of the master-slave manipulator apparatus and the control method thereof according to the present invention, will be explained in details thereof.

However, in this example, it is assumed that the number of the driver shafts of the master is 3 (N=3) and the number of the above force detectors is also 3 (i.e., the force detector 1 to force detector 3: 201–203), for the purpose of simplifying the explanation thereof. Also, as a method of simplifying the output result from the force detector 201–203, explanation will be given by using a binarization with the threshold.

Also, the drive direction (i.e., the degree of freedom) of the master 1 is assumed to be (1) a swing of a link 301 around a rotation center 304, (2) a rotation of a link 302 around a vertical direction, and (3) a translational movement or motion of a link 303 in the vertical direction. Further, it is also assumed, when the link 302 rotates, the link 301 which is fixed or connected to the link 302 also rotates at the same time, and when the link 303 makes the translational movement, the link 302 fixed to this link 303 and the link 301 fixed to the link 302 also make the translational movement, as well.

Further, the force detector 201 detects a bending of the link 301 functioning as the above operation portion. On a while, the force detector 202 detects a twist of the above link 302. Also, the force detector 203 detects a compress of the above link 303. However, the driver shaft for driving the above link 301 is assumed to be a shaft 1, the driver shaft for rotationally driving the above link 302 be a shaft 2, and the driver shaft for driving the link 303 be a shaft 3.

And, the output signals (1–3) 1401, 1402 and 1403 which are detected by the respective force detectors 1301, 1302 and 1303 (corresponding to the above force detectors 201, 202 and 203) are binarized, by using a predetermined threshold value for each, in the simplification process thereof. Namely, if the output signal is equal or more than the threshold value, it is "1", otherwise is "0" if being smaller than that. From the results of such the binarization process, the pattern of the operation force is produced or generated (see the block 16 in the FIG. 2).

Further, in production of the pattern of operation force, the signals "1" or "0" being processed with the above binarizing process is aligned in an order of the number of the sensors, which is determined in advance, thereby to produce an alignment of the signals "1"s and "0"s. Thereafter, this pattern produced is compared with the pattern of the decision table 19 which is recorded in advance, thereby to decide the driver shaft to be driven corresponding to the input (see the block 17 in the FIG. 2). Namely, being apparent from the figure, in accordance with this decision table 19, the shafts to be driven (i.e., the shaft 1, shaft 2 and shaft 3, including "stop") are determined in advance, corresponding to eight (8) modes of the patterns, so as to drive the driver shaft(s) corresponding to this (see the block 18 in the FIG. 2). Further, in the present embodiment, since the production of the above pattern is made only with the binary information of "0" and "1", though it is possible to decide the shaft to be driven, however the direction to be driven may be decided separately, on the basis of the polarities (±) of the outputs of the force detectors 1301, 1302, and 1303.

Here, for example, as shown in the figure, in a case where the result is "0" in the above threshold value decision 1501, and it is "1" in the above threshold decision 1502, and it is "1" in the above threshold decision 1503, then a pattern "110" is produced by aligning those in an order from the right-hand side, sequentially. The reason of producing the pattern by aligning them in this order is to make it in the same order of the pattern of the decision table 19 as shown in the FIG. 2. And, as a result of comparing the pattern "110" which is produced in this block 16 to the pattern of the above-mentioned decision table 19, it is decided the shaft 2 is that driver shaft that is meant or indicated by the pattern "110".

Next, details of the correspondence between the pattern of operation force and the driver shaft(s) in the above-mentioned decision table 19.

First, the pattern "001" means that the output of the force detector 201 exceeds the threshold value, while the outputs of the remaining two (2) force detectors 202 and 203 does not. In this instance, when the force is applied only to the force detector 201 is only a case where the bending input is applied to the link 301, and this indicates that it is the operation input for driving the link 301. Therefore, it is apparent that the driver shaft to be driven is the shaft 1 corresponding to this pattern "001".

Figure 3A:
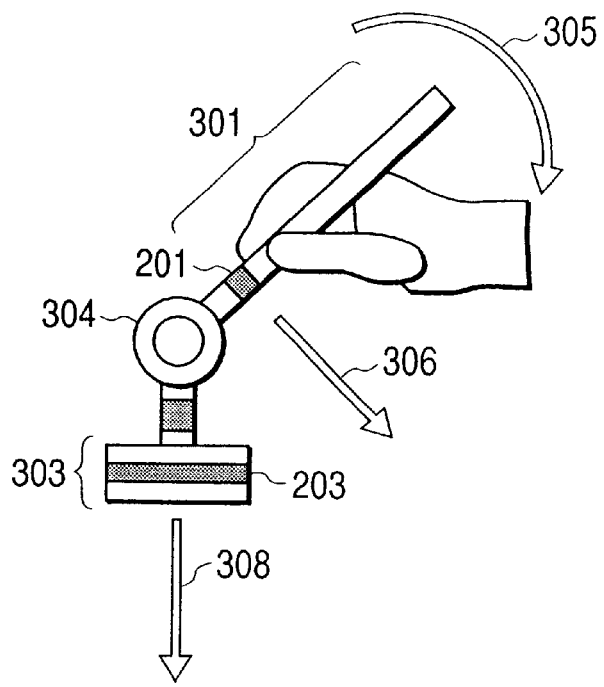
FIG. 3 is a view for explaining a manner of applying operation force to a master manipulator.
Figure 3B:
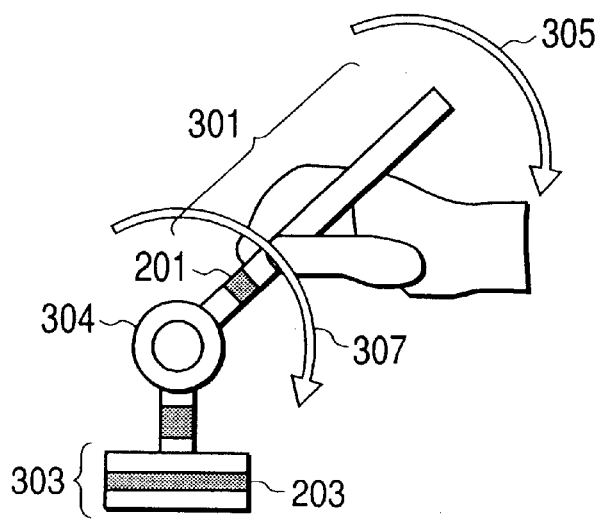

Further, in FIG. 3(b) attached is shown the condition of the master 1 when this pattern "001" is inputted. Here, in order to apply a force only to the force detector 201, as indicated by an arrow 307 in the figure, there is a necessity that the operation is made with being conscious of the rotation center of the link 301. And, by having conducted such the operation, the force being generated comes to be only a force bending the above-mentioned link 301, in that direction indicated by an arrow 305, therefore it is possible to transmit the intention of the operator to the master manipulator with clearness and/or correctness.

In the same manner, the pattern come to be "010" when a rotating input is made on the link 302, and the driver shaft corresponding to this is the shaft 2. Also, when a compression input is made, the pattern comes to be "100", and the driver shaft corresponding to this is the shaft 3.

Also, a chance or a case when the output of pattern "101" is generated is in a case where an input is made with an intention of swinging the link 301, however on that occasion, the compression force is also applied to the link 303 at the same time, without the operator's intention, as the result this, also the output of the force detector 203 exceeds the threshold value. The condition of this case is shown in the FIG. 3(a). Such the operation may be caused, for example, when the operator makes that operation without being conscious of the rotation center, wherein the operation input is made so that the direction of the operation is directed into an arrow 306 as shown in the FIG. 3(a), and as the result of this, not only the force in the direction of an arrow 305, but also the force directed into an arrow 308 are applied onto the link 301, irrespective of the intention of the operator. The force in the direction indicated by this arrow 308 has been detected by the force detector 203 as a sensor for detection the compression, undesirably, and it sometimes exceeds the threshold value. At this time, the output pattern "101" is generated.

Then, according to the present embodiment, when such the output pattern "101" is generated, by taking the inherent or original intention of the operator into the consideration, it is assumed that it is the operation for inputting the drive of the link 301, in the similar manner as the above pattern "001", thereby selecting the shaft 1 as the driver shaft to be driven.

Further, a chance when a pattern "011" is generated is in a case where the operator gives erroneously a movement to swing onto the link 301 which she/he holds in her/his hand irrespective of her/his intention, though trying to conduct the operation input onto the link 302 so as to make the rotation thereof, and as a result this, the output of the force detector 201 exceeds the threshold value. Further, other chance when the pattern "110" is generated is a case where, for example, the orbit of a rotating movement which is performed by the operator occasionally falls down at the side of operator's dominant arm, when she/he tries to make that rotation movement, and as a result of this, irrespective of the intention of the operator, the force is also applied into the direction of compression of the link 303, thereby the output of the force detector 203 exceeds the threshold value, undesirably.

Then, according to the present embodiment, when those output patterns "011" and "110" are generated, by taking the inherent intention of the operator into the consideration, it is assumed that they are the operation for inputting the rotation of the link 302, in the similar manner as the above pattern "010", thereby selecting the shaft 2 as the driver shaft to be driven.

Further, when any one of the outputs of the force detectors does not exceeds the threshold value, such as an output pattern "000", it is a fact that no input is made by the operator, therefore no shaft is selected to be driven, i.e., in a condition "stop". Also, in such a case when all of the detected outputs of the force detectors exceed the threshold values, it is also in the "stop" condition, since not only a fact that it is impossible to decide the intention of the operator, but also there can be further expected a possibility of an abnormal input due to an influence of external force(s), therefore it is preferable to take a process of stopping the driving of all the shafts, including the shafts being driven at present.

In this manner, when trying to perform the operation input in a certain degree of freedom onto the driver shaft of the manipulator, and also when the operator erroneously applies the force to come off from the orbit of the movement in that degree of freedom without her/his intention, through processing the drive inputs from the master manipulator as the patterns in aid of operation of the patterning process portion 7 of the controller 4, it is possible to reflect the intention of the operator much more. However, it is of course true that this pattern differs depending upon the construction of the master and the positions of the sensors, etc.

Namely, according to the method, in which correspondence is made between the sensor (i.e., the force detector) and each of the driver shafts in any instance, so as to drive the driver shaft(s) depending upon the output(s) of the corresponding sensor(s), as in the conventional art, when such the operation is performed as shown in the FIG. 3(a), the operation input which the operator does not intend is made undesirably, as a result, the slave makes such a movement in a manner that the operator does not intend. On the contrary to this, according to the present invention, as shown in the above FIGS. 1 and 2, the outputs from the plural force detectors are held as the pattern, at each sampling timing, and the shaft(s) is decided to be driven from that pattern, therefore it is possible to remove such the force(s) that may be inputted unconsciously, so as to reflect the intention of the operator, correctly and accurately.

Figure 4:
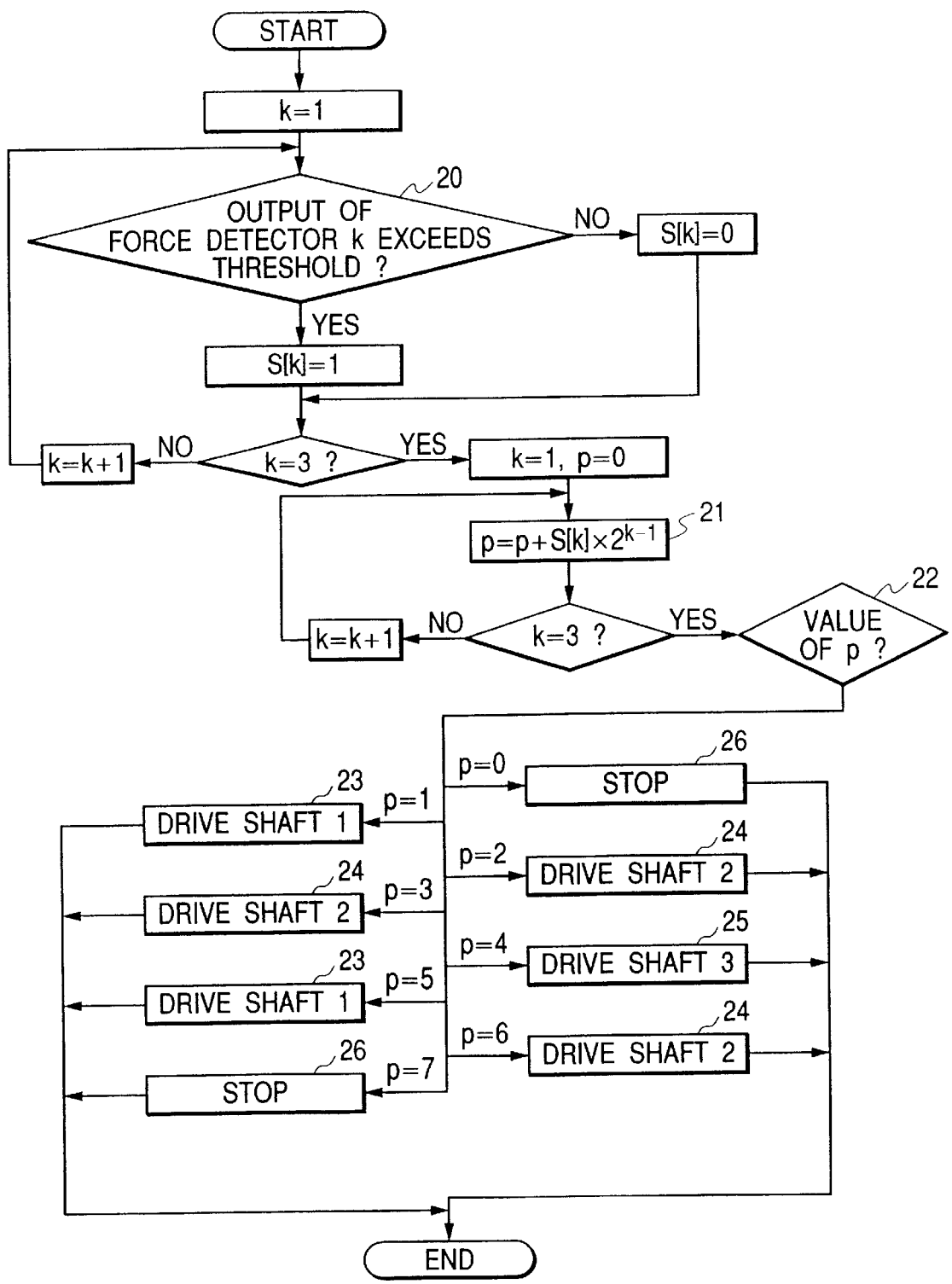
FIG. 4 is a control flow chart for showing the details of the patterning process for deciding a driver shaft, by the patterning process on the manner of the operation force applied to the above master manipulator.

Further, in the FIG. 4 is shown the control flow of the controller explained in the above, in particular, in the patterning process portion 7. However, this flow is also explained by assuming that both the numbers of the driver shafts of the master and the force detectors are three (3), according to the example shown in the above FIG. 2. However, in the actual controls, the drive control is executed by sampling the outputs of the force detectors 1301 to 1303 through an interruption process which is conducted periodically. The flow in the FIG. 4 shows the patterning process accompanying by the sampling at one time.

In the flow in the FIG. 4, first in a block 20, it is decided whether the output of the force detector k exceeds the threshold value or not, and as a result, S[k]=1 if decided to exceed it, otherwise S[k]=0 if not exceed it. Namely, by this, the binarization process is performed. However, the value of this k is set depending upon the number of the force detectors. In more details, in the present example, k=1 to 3 in the number.

When the binarization process is completed on the output results of all the force detectors with the process mentioned above, next it enters into a process of producing the pattern of those. This pattern producing process is performed in a block 21 of the figure. Namely, in this example, s[k]×2^{k-1} is added to p which is initialized by 0 in advance. For example, when k=1, in other words, the force detector 201 of the above FIG. 2 exceeds the threshold value, 1 is added to p. Also, when k=2, in other words, the force detector 202 of the above FIG. 2 exceeds the threshold value, 2 is added to this p. Further, when k=3, in other words, the force detector 203 of the above FIG. 2 exceeds the threshold value, 4 is added to that p. This is because, when presenting the number to be added in binary number system, it is so constructed that the result of the binarizing process of the force detector 201 corresponds to a first digit, the result of the binarizing process of the force detector 202 to a second digit, and the result of the binarizing process of the force detector 203 enters into a third digit, respectively. Also, the positions of the digits, into which the results of the binarizing process of the respective force detectors are assigned to, are arranged in the order of that as shown in the decision table 10 of the above FIG. 2, for fitting them to this, however the order does not matter as far as it corresponds to the above-mentioned decision table 19.

After establishing the value p in this manner, they are divided into cases or circumstances depending upon the values thereof in a block 22, thereby to drive the driver shaft corresponding thereto. For example, when p=1 or 5, the shaft 1 is driven in a block 23, when p=2, 3 or 6 the shaft 2 is driven in a block 24, and when p=4 the shaft 3 is driven in a block 25. However, when p=0 or 7, no shaft is driven in a block 26. Here, this is since, when p=7, as mentioned previously, there can be expected that the abnormal input is made when the forces exceed the threshold values in all directions, and in such the case, it is possible to rise up safety much more by venturing to perform the process of stopping the shaft operating at present. And, by deciding the driver shaft in this manner, the flows of the patterning process portion is ended in one time or round of the sampling.

Further, according to the process shown in the FIG. 4, it is possible to arrange the information in relation to the operation forces being taken from the above plural force detectors as the pattern, and to make a process of comparison of it with the pattern which is recorded in advance. However, by arranging the patterns so that the processed result of the outputs of the respective force detectors fits to each of the bits of the binary number, as mentioned in the above, it is possible to handle the pattern as an integer (i.e., a numeral presented by a pattern of those "0" and "1"), therefore it is advantageous, in particular, in aspects of easiness in programming, in processing speed, etc.

Figure 5:
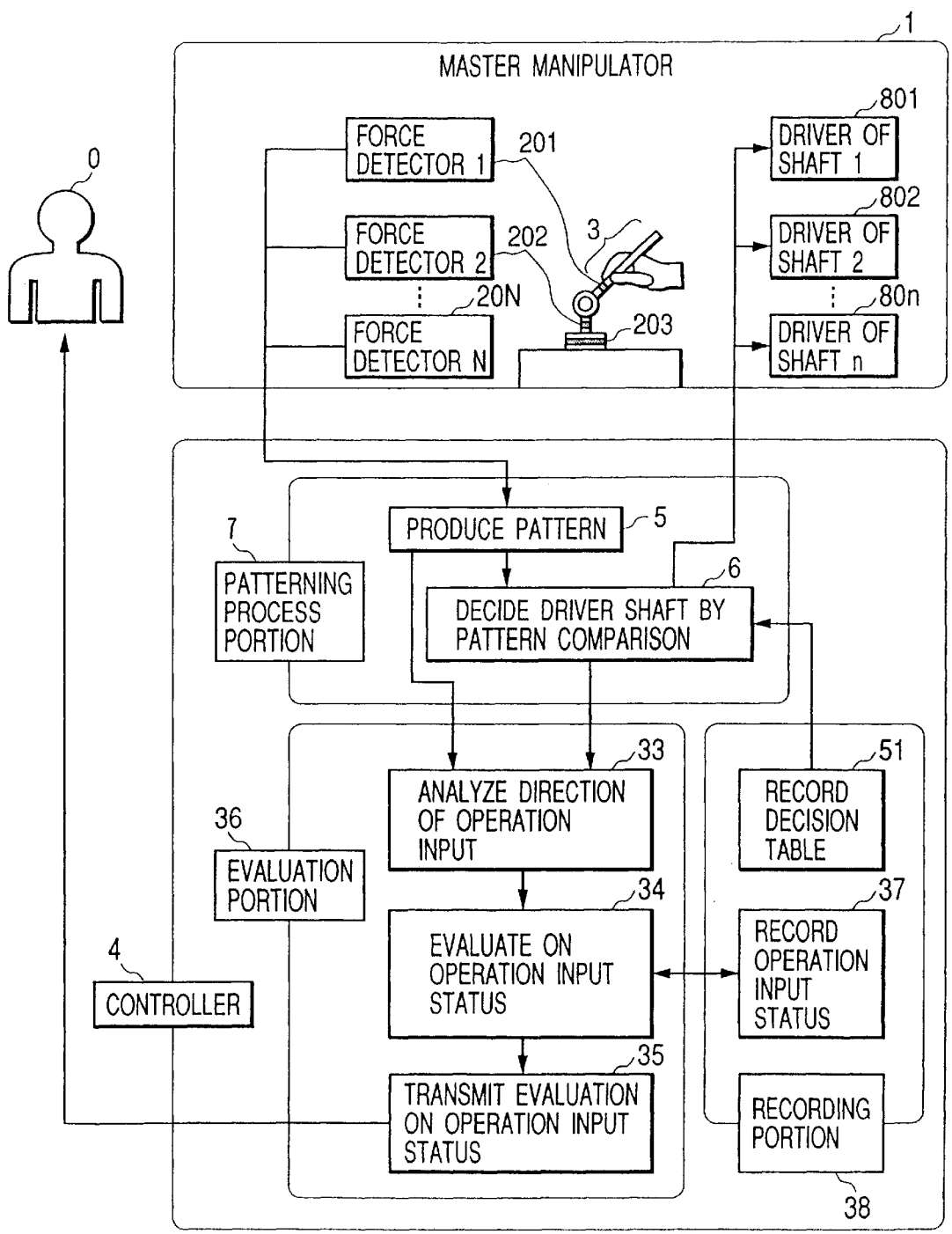
FIG. 5 is a view of the system configuration for showing an outline of a training apparatus for manipulator input, according to another embodiment of the present invention.

Next, FIG. 5 attached shows an operation input training system for the master-slave manipulator apparatus explained in the above, and in this system, also in the same manner as mentioned above, a training for the operation input is practiced by using the pattern of the operation force. Namely, also in this training system, the driver shaft which the operator O intends to operate and the force which is applied to the operation portion thereof can be caught from the pattern of the operation force, as is mentioned in the above. However, the force being applied to the operation portion includes the force being applied unconsciously, and the force being necessary for driving the shaft which the operator intends to as well. By the way, utilizing the relationship between the pattern of the operation forces and the driver shaft which is indicated by that pattern, it is possible to decide or divide between the force being applied to the driver shaft as the operator intends to and an unnecessary force being applied to the driver shaft in the unconsciousness.

Then using this, it is possible to enable to input the intention of the operator clearly in the actual operations of the manipulator, thereby enabling a training of operation free from the force which the operator may applies in the unconsciousness. Further, as is apparent from the figure, this operation input training system has such the construction that the slave manipulator 12 is removed from the manipulator apparatus shown in the FIG. 1, therefore mentioning of details of the construction will be omitted, here. However, with such the operation input training, it is also possible to practice the training while operating the slave manipulator in actual, however in such the case, it is of course for the person skilled in the art that such the system comprises the structure, including the slave manipulator therein.

In the construction mentioned in the above, the operator O, practicing the training, operates the master 1 in actual. Thereby, the operation force applied to the operation portion 3 is also detected by the force detectors 201, 202, 20N. And, from the signals detected by those force detectors, the pattern of the operation force is produced by means of the pattern producing means 5. The pattern produced here is further compared with the pattern which is recorded in advance, thereby to decide the driver shaft. Namely, according to the result of this decision, the driving means (i.e., from a driving means of shaft 1 to a driving means of shaft n) 801 to 80n. However, the processing operation heretofore is same to that of the above-mentioned in the first embodiment. However, in the present embodiment of the operation input training system, there is further existed or provided an evaluation or estimation portion 36 of using the output of the patterning process portion 7.

In this evaluation portion 36, first, the force necessary for driving and the force being applied unconsciously are decided by means of an operation input direction analyzing means 33, from the pattern which is produced in the above pattern producing means 5 and the result from the driver shaft decision means 6, by pattern comparison thereof. Next, from the result of this operation input direction analyzing means 33 and also the data being obtained by the interruption processes of a predetermined number in the past, a status or condition of the operation input by the operator is analyzed and evaluated. Here, for example, it is calculated out in which direction, and also at which rate, the unnecessary force is generated in the force, which is actually applied to so as to drive the shaft, on which the operation is made at present (in an operation input status or condition evaluating means 34). And, the result of this is noticed to the operator through an operation input evaluation transmitting means 35.

Further, the above-mentioned operation input evaluation transmitting means 35 transmits or inform the result calculated out from the operation input status or condition evaluating means 34 on a monitor, through indicating it by figures or graphics thereof, visually to a trainee. The operator as that trainee practices the training so that the force being applied unconsciously when operating the manipulator is lessened or reduced, on the basis of the information informed her/him, thereby enabling to perform the operation input, less of the operation not intended, but with making the will by her/himself clearer.

Further, when an excess force is applied to when the trainee practices the operation, not only by the operation input evaluation transmitting means 35 mentioned-above, but also by generating an alarm sound, she/he can grasp the evaluation of the operation input by her/himself while seeing the slave practicing the work in actual, while looking aside the monitor. At this time, by changing or shifting the alarm sound generated, for example in a timber or tone or a voice, or a tune (high or low), or sound volume thereof, depending upon the stage or level of the evaluation on the rate at which the unconscious force is generated, etc., it is also possible to transmit or inform even the details of the estimation.

However, it is also possible to record the estimation of the operation input status or condition which is calculated out in this operation input status or condition evaluating means 34, into an operation input status or condition recording means 37 of the recording portion 38, for example, for the purpose of using as the operation condition of the past in the operation input status or condition evaluating means 34.

Figure 6:
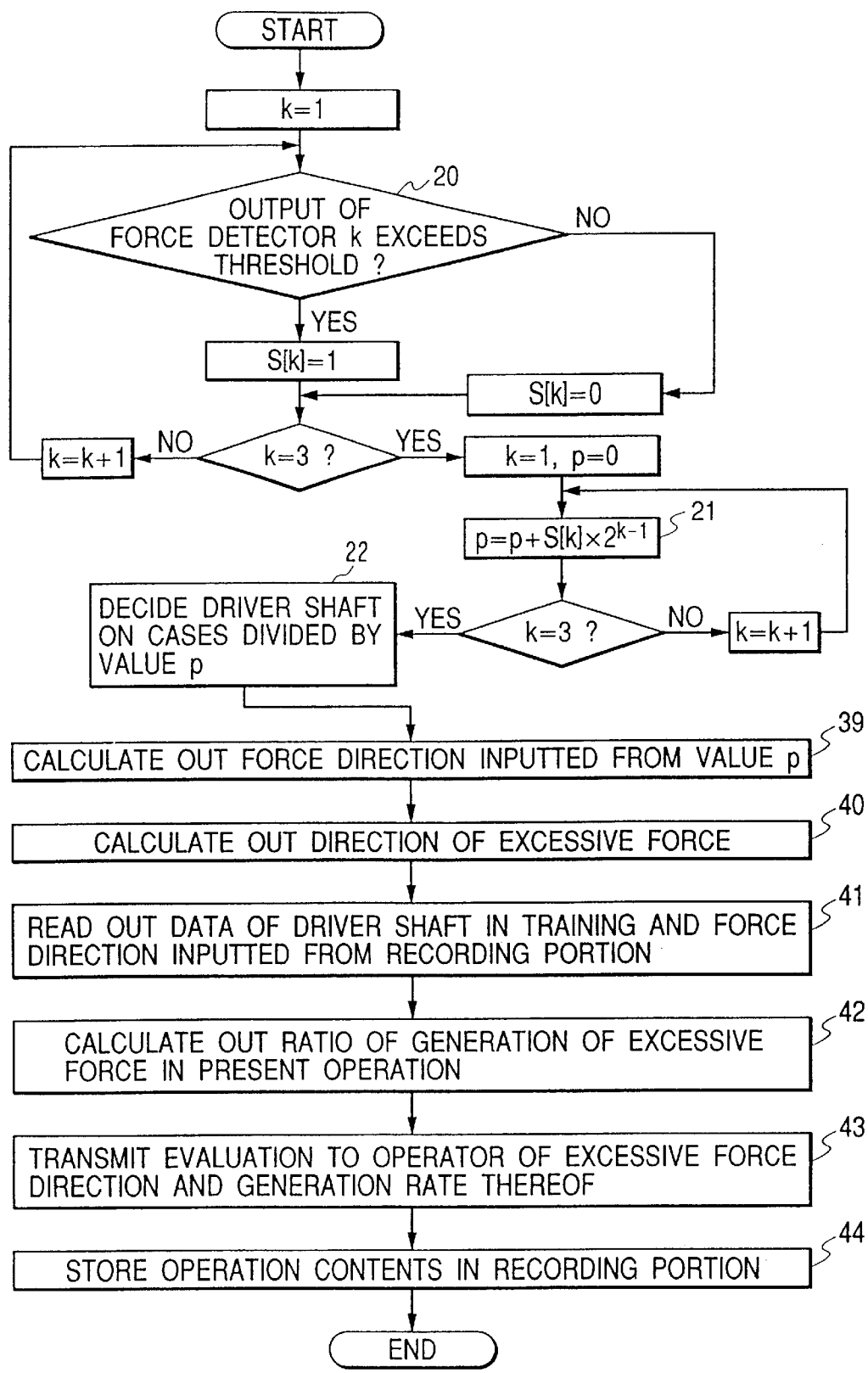
FIG. 6 is a control flow chart for showing the details of the patterning process and an estimation process on training contents, in the above-mentioned training apparatus for manipulator input.

Next, in FIG. 6 is shown the control flow in the operation input training system shown in the above FIG. 5. Also in this control flow, in the same manner as in the control flow in the above FIG. 4, explanation will be given on a case where both the numbers of the driver shafts and the force detectors of the master are three (3), and also on the flow of at one time of the samplings which are executed by the periodical interruption process.

Namely, in the FIG. 6, in a block 20 it is decided whether the output of the force detector k (k=1, 2 or 3) exceeds the threshold value or not. As a result of the decision, S[k]=1 if it is decided to exceeds the threshold value, otherwise S[k]=0 if decided to be equal or less than that. From a result of this binarization, further the pattern p is produced in a block 21. Further, in a block 22, it is divided into cases or circumstances depending upon the value of this pattern p produced, thereby to decide the driver shaft. The processes heretofore are totally the same as those in the control flow in the above FIG. 4.

Continuing, in a block 39, the direction of force which is 30 inputted by the operation is calculated out from the value of the pattern p. Next, from the direction of force necessary for driving the driver shaft which the operator intends to operate and also the direction of force which is actually inputted by the operation, the direction of the excessive force being applied unconsciously is calculated out in a block 40. Here, by referring, in a block 41, to data obtained through a predetermined times of interruptions in the past, being recorded in the above recording portion 38, a ratio can be calculated out at which the excessive force may occur in the present operation in a block 42. And, the directions of the excessive forces calculated out heretofore and the ratio of occurrences thereof are transmitted or informed to the operator, through a screen display using the above monitor or generation of the alarm sound in a block 43. At last, the operation contents obtained in the interruption process of this time is recorded into the above recording portion 38 in a block 44. With this, the processes of the patterning process 7 and the evaluation portion 36 in the interruption process of at one time. With such the control flow, it is possible to realize the operation input training system shown in the above figure.

In FIG. 7, further explanation will be given on the control flow of the process which is executed at time when the training is ended. This training may be ended when the operator completes a sequence of operations programmed, or may be ended any time at the operator's will. In both of the cases, the controller 4 receives a sign or signal of this training end (in a block 45). And, after receiving the signal of this training end, the evaluation of the operation conditions during the training at this time are calculated out (in a block 46), for each driver shaft of the master. Further, the calculated evaluation on operation conditions relating to all of the driver shafts is displayed on the screen of the monitor (in a block 47).

With this, the operator as the trainee can grasp the operation details of her/himself in the training at this time, and also with comparing it to the evaluation when training at the previous time, thereby being able to know a state on progress in the status or condition of operation input by her/himself. Also, by inputting the personal name of an individual when starting the training so as to reserve the evaluation at the completion of the training, it is possible to manage the state on progress of the individual. Further, with indication of the history of the evaluation to the operator, there can be expected an effect of giving an incentive or motive to the training.

Figure 8:
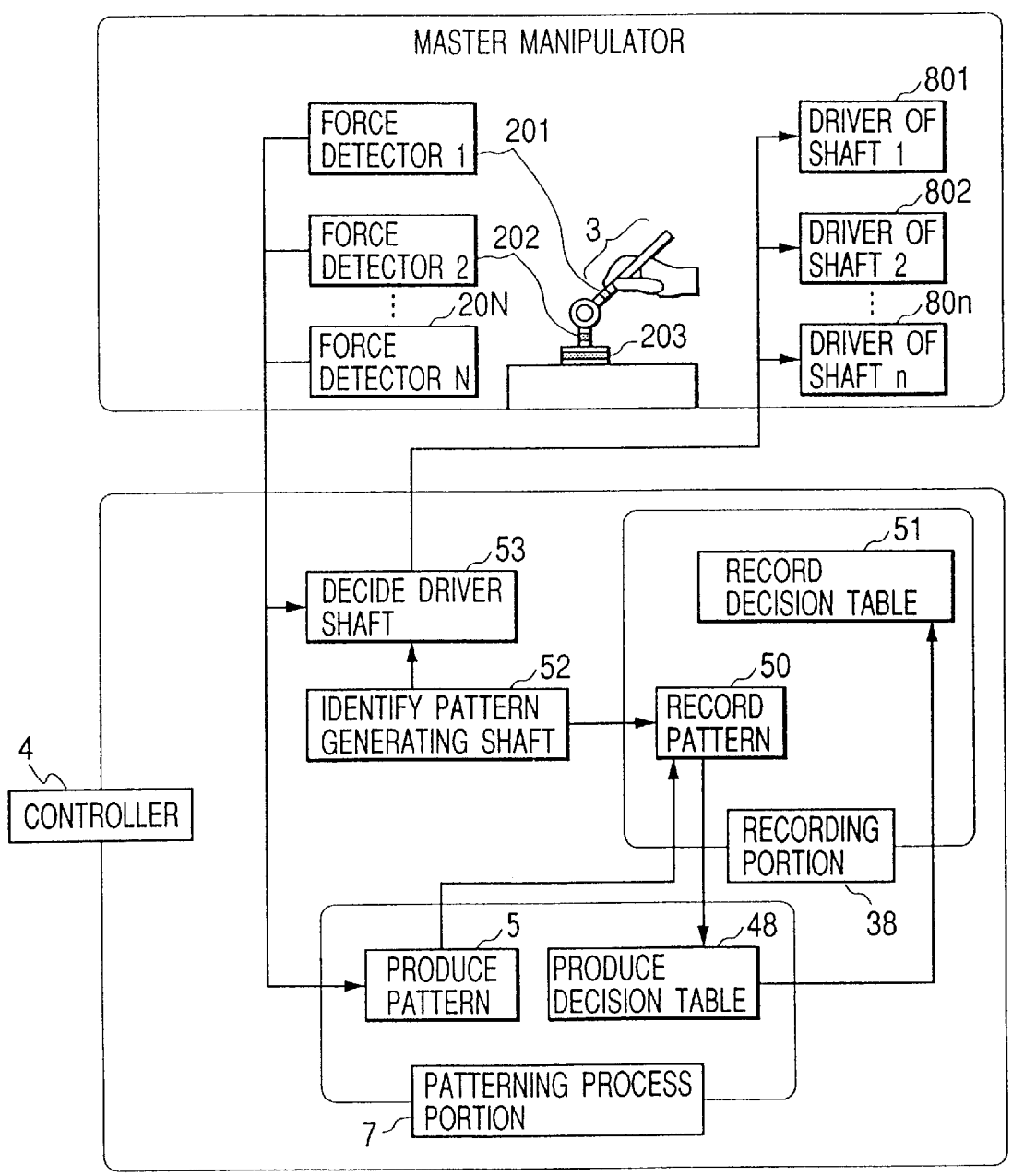
FIG. 8 is a view for showing an example of the detailed construction of a controller for producing a decision table for an individual, which is used in the patterning process on the manner of applying the operation force thereto.

Further, in FIG. 8 is shown the construction for producing the decision table 19, indicating the relationship corresponding between the pattern of the operation forces and the driver shafts, to be recorded in the above controller in advance. As a method thereof, first before the operation, the driver shaft (an objective or target shaft: the degree of freedom) is set up, on which the pattern should be produced by means of a pattern producing shaft specifying means 52. However, during production of this pattern, the shafts other than the objective one are fixed. On this objective shaft (the degree of freedom), the operation forces necessary for driving that shaft are detected by the force detectors 201 to 20N, thereby controlling to drive the objective shaft responding to the signals detected thereby (i.e., driving the driver means 801 to 80n for the shaft 1 to shaft n, by the drive decision means 53). However, here, if such the force is inputted unconsciously that it drives the other shaft(s), it is neglected since those other than the objective shaft are set not to be driven. Restricting to the drive of the objective shaft in this time, only the outputs of the force detectors are watched, but in that sense, it is not different from the control method of the conventional art.

And in such the operation, separate from the control of the drive mentioned above, the collection of the patterns is conducted. Namely, in the pattern producing means 6 of the above pattern processing portion 7, the patterns of the outputs from all the force detectors are produced, and those are stored in the pattern recording means 50 of the above recording portion 38. The pattern to be collected here is a pattern including the force due to the unconsciousness other than the force being necessary for driving the objective shaft. Here, though the others than the objective shaft are fixed, however it does not matter in the time of actual control, since they can be also approximated to be in condition of being fixed, for all driving times, observing them for a short time period in which the interruption process is executed.

Hereinafter, the patterns are collected in the same method, for all of the driver shafts. And, after completing the operations of the pattern collection, the decision table 19 of describing the relationships between the patterns and the driver shafts is produced in the decision table producing means 48, upon the basis of the patterns recorded in the above pattern recording means 50. A concrete example of the method for producing this decision table 19 will be explained, by referring to FIG. 10 below. However, by executing such the processes, it is possible to produce the pattern fitting to actual circumferences, including such as a personal habit of the operator, the construction of the master, and the positions of sensors (i.e., the force detectors). In particular, for the master using a plurality of the operators therein, by producing such the pattern for each of the individuals, it is possible to reflect the will of the operator her/himself to the operation of the master, with more accuracy and correctness.

Further, by referring to FIG. 9, explanation will be given on the control flow of the method for producing the decision table shown in the above FIG. 8. Also in this FIG. 9, in the same manner to those heretofore, the explanation will be made on an assumption that both the numbers of the driver shafts of the master and of the force detectors are three (=3). In the actual control, the outputs of the force detectors are sampled cyclically, however in the flow shown in the FIG. 9, there is shown a flow of collection of the patterns accompanying with at one time of the sampling thereof.

Figure 9:
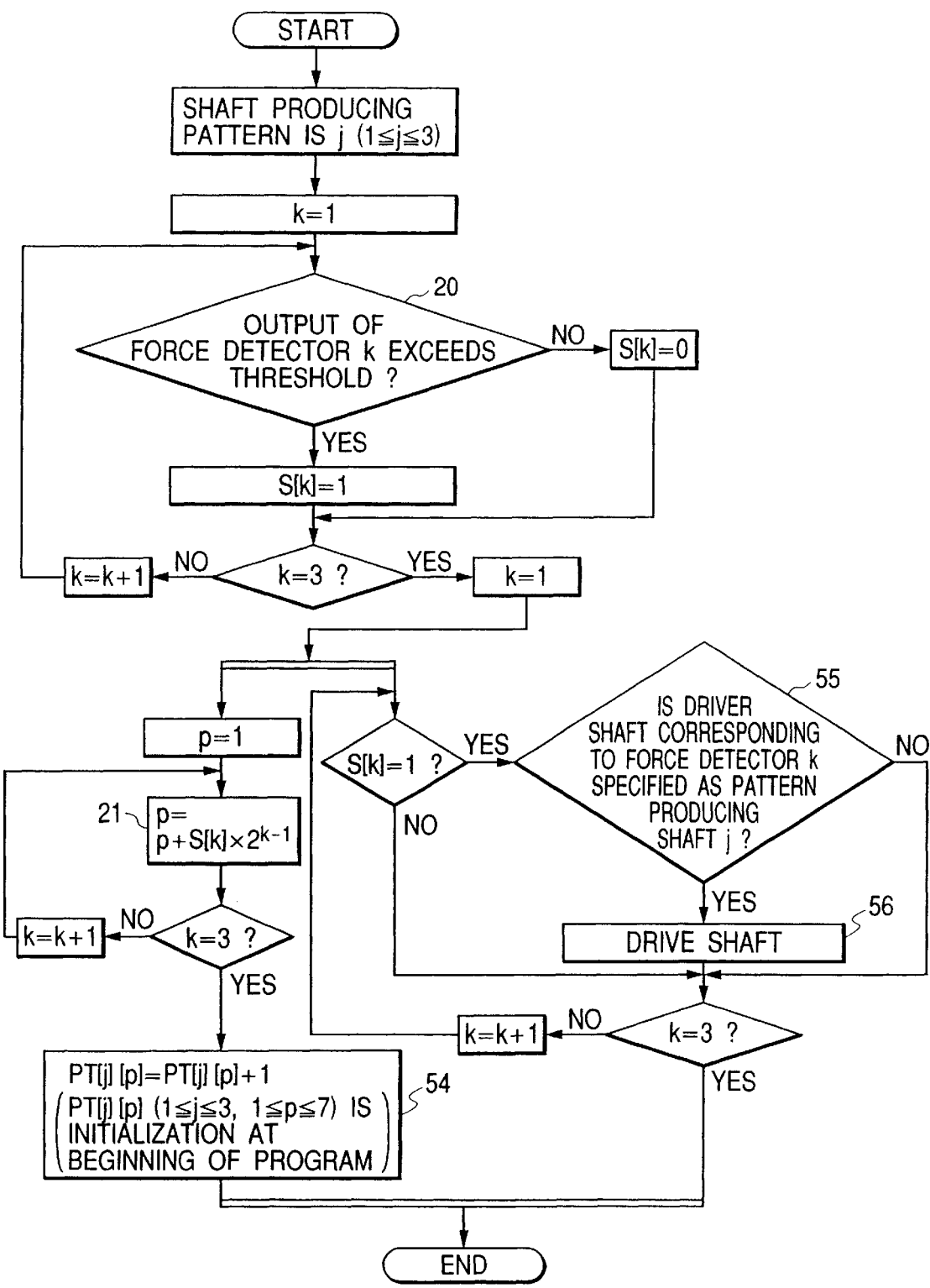
FIG. 9 is a control flow chart for showing the details of collection of patterns for producing the decision table for an individual, which is used in the patterning process on the manner of applying the operation force thereto.

However, the control flow of the method for producing the decision table in this FIG. 9 is same to that shown in the FIG. 4, until the outputs of all the force detectors are binarized through the decision with use of the threshold value (in a block 20). And, from this binarized information of the force detectors, the pattern p is produced in a block 21. And, the pattern p produced, the number of the objective shaft(s) on which the pattern is produced, and an information of number of times, indicating how many times the pattern p is obtained during the pattern production, are reserved as PT[j][p] in a block 54. Here, j ($1 \leq j \leq 3$) indicates the number of the shaft, and p ($1 \leq p \leq 7$) the value of the pattern. For example, when the pattern p=3 is obtained during when producing the pattern of the shaft 1, "1" is added to the value of the PT[1][3]. And, at the time when completing all the works of collecting pattern, it comes to be possible to know from the value of this PT, what kind of pattern occurs on which shaft, and how many times. From this, it is possible to collect the patterns which can be obtained when driving the objective shaft.

Also at the same time when collecting the patterns, the driving of the objective shaft is controlled in blocks 55 and 56. Namely, it is assumed that the force detector k detects the force being applied onto the shaft j. And, when the output of this force detector k exceeds the threshold value, in the block 55, it can be seen whether the shaft j is the objective shaft for pattern production or not. As a result of this, if it is the objective shaft, the driving is executed in a block 56, on the other hand if it is the other than the objective shaft, it is controlled not to drive it irrespective of the value of the force detectors.

Figure 10:
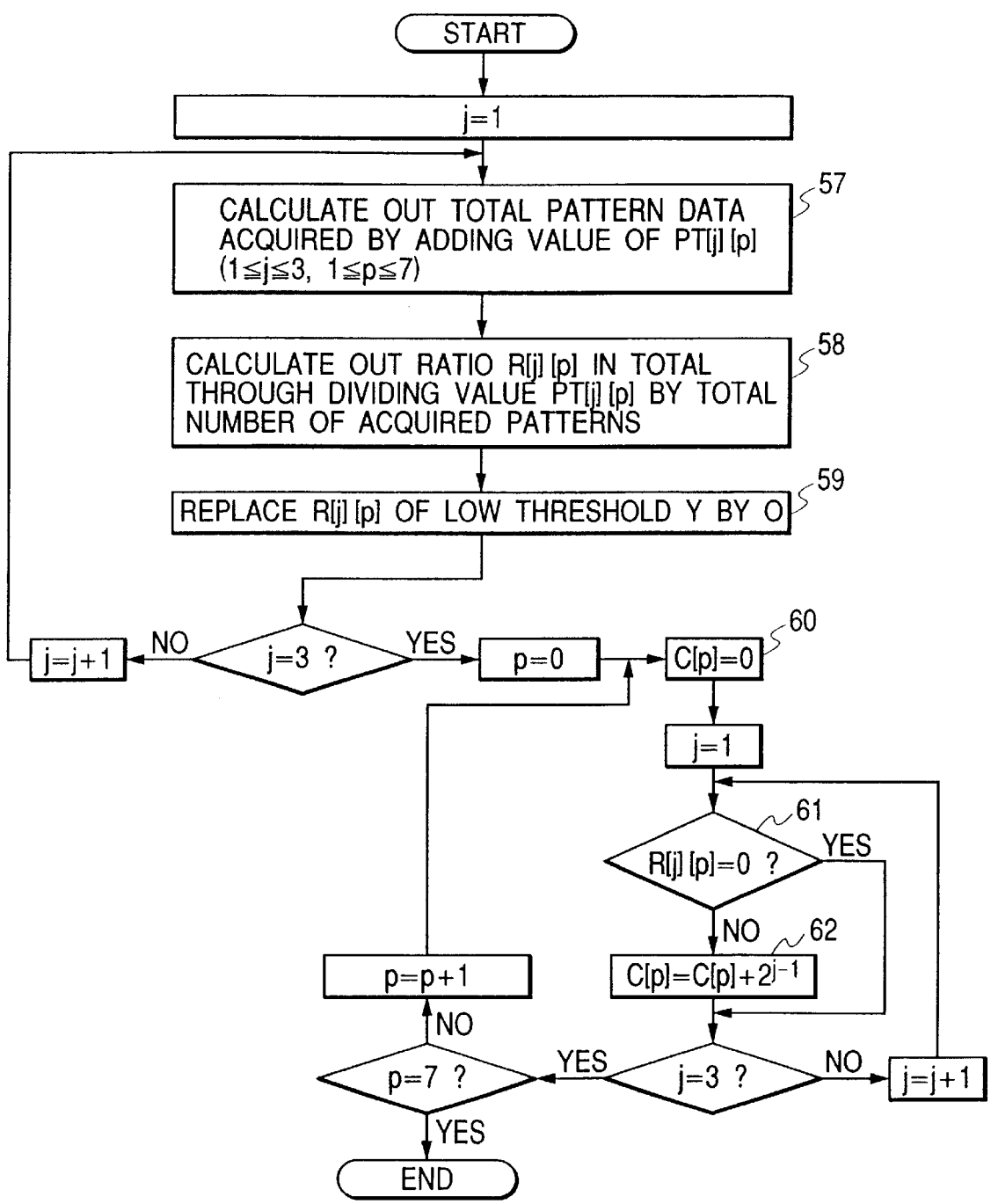
FIG. 10 is also a control flow chart for showing the details of collection of patterns for producing the decision table for an individual, which is also used in the patterning process on the manner of applying the operation force thereto.

Further, in FIG. 10, where is shown an example of the method for producing the above decision table 19, there will be explained a process flow for producing the decision table 19 from those data after collecting the patterns of all the driver shafts. Also here, explanation will be given on an assumption that both the numbers of the driver shafts and of the force detectors are three (=3).

First in blocks from 57 to 59, a process is carried out so that, among the patterns obtained on the respective driver shafts, the ones generation at a rate being lower than a predetermined value are removed as the noises therefrom. This process is treated on each shaft. Namely, in the block 57, when the shaft number j=1, all the values of PT[1][p] ($0 \leq p \leq 7$) are added so as to calculate out a total number of the pattern data which are acquired or learned. Next, for each value of p, the value PT[1][p] is divided by the total number calculated out in the block 57, thereby to calculate out a rate of generating PT[1][p]($0 \leq p \leq 7$) in the total. Assuming this rate to be PT[j][p]($0 \leq p \leq 7$), for example when the shaft number is j=1 and the pattern p=0, the rate calculated out is stored in R[1][0]. Also, the value of R[1][p] is lower than a predetermined threshold value Y, R[1][p] is replaced by 0. In this manner, the same process is treated on all of the driver shafts.

Next in blocks 60, 61 and 62, data of all the shaft numbers where the pattern p occurs are stored. When the same pattern occurs on a plurality of the driver shafts, all of those shaft numbers are stored. First, the driver shaft generating the patter of p=0 is checked. If the pattern p occurs at the driver shaft j, all the shaft numbers generating the pattern p are stored as a value of C[p], by adding $2^{j-1}$ to C[p]($0 \leq p \leq 7$). This is a method being same to that used in the arrangement of the patterns, and it is possible to know the shaft number which generates the pattern p, by a fact at which number in the order of bits appears "1" counting from the right-hand side end of this c[p] when being expressed by the binary number system.

First, in the block 60, this C[p] is initialized. Next, in the block 61, it is checked whether the pattern P=0 occurs at the shaft number j=1 or not. In this block 61, if R[1][0] is other than 0, $2^{j-1}=1$ is added to C[0] in the block 62, thereby recording the fact that the pattern p=0 occurs on the shaft 1 into a variable of the C[0]. With the same process, whether the pattern P=0 occurs or not is checked for all the shaft numbers, and if occurs, $2^{j-1}=1$ is added to the C[0], in the same manner as in the above. And, if the check is completed for all of the shafts, with respect to the pattern p=0, further the same process will be repeated until to the pattern p=7.

By executing such the processes, it is possible to make a correspondence between a certain pattern p and the driver shaft being meant or indicated by that pattern, therefore it is also possible to produce the decision table 19 for each individual of the operators.

Further, an example of the decision table which is produced with such the process will be shown in FIG. 11. In this decision table 63 which is produced, "p" indicates the pattern, and C[p] the driver shaft being related with the pattern p mentioned above. Here is shown an example, wherein there exists the pattern(s) which lists up a plurality of driver shafts as the candidates therefor. Also within brackets of the decision table 63, the ratio R[j][p] of occurring the pattern p is indicated and described by a percentage, for each of the driver shafts.

Explanation on a method for utilizing of those will be given by referring to FIG. 12 and those thereafter. However, here a "classification" in the figure is indicated by the number "1" when one driver shaft is assigned to one pattern, and this means that it is the pattern in which the intention of the operator is clear. Also, a classification "2" indicates that a plurality of driver shafts are listed up as the candidates for one pattern. Further, a classification "3" means a pattern, in which no corresponding driver shaft cannot be obtained as a result of producing the pattern in the embodiment shown in the FIG. 8, for example, i.e., it indicates that there is no shaft to be driven.

Figure 12:
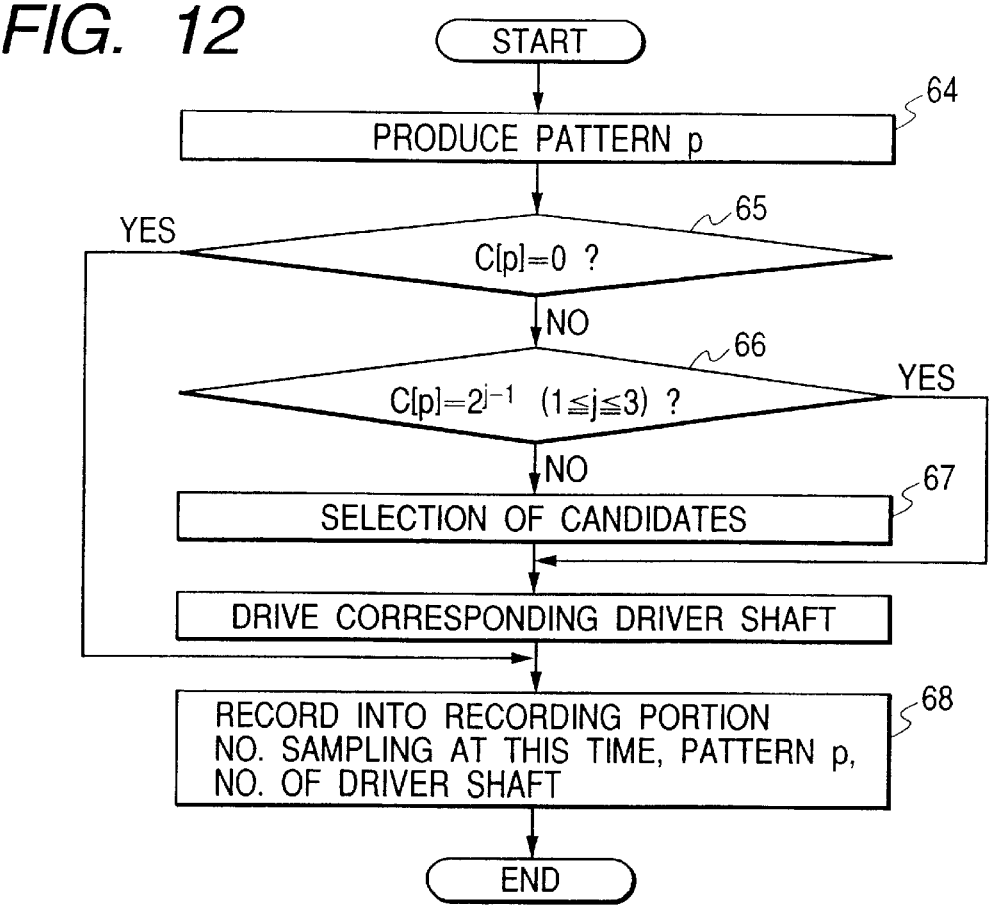
FIG. 12 is a control flow chart for showing the patterning process when the decision table is used, in which a plurality of driver shafts are listed up as candidates therefor, in the embodiment mentioned above.

As mentioned in the above, in the FIG. 12 is shown the control flow in relation with the patterning process, when using the decision table 63 of such a type that there is the pattern for which a plurality of driver shafts can be listed up as the candidates therefor. In this example, also in the same manner heretofore, explanation will be given on an assumption that both the numbers of the driver shafts and of the force detectors are three (=3). However, though the outputs of the force detectors are sampled cyclically in the actual control, in the flow of this FIG. 12, there is shown only the flow of the pattern collection being accompanied by that one cycle of the samplings.

In the FIG. 12, first in a block 64, the pattern p is produced from the outputs of the force detectors, in the same manner in the examples explained heretofore. Next, in a block 65, by using C[p] being explained in the flow of the FIG. 10 mentioned above, the driver shaft will be checked, on which the pattern p occurs. Here, for example if C[p] is "0", it means that there is no shaft to be driven, and the process accompanying with this sampling is completed or ended as it is. On the other hand, if C[p] is other than "0", in a block 66, it is checked that the number of the shaft(s) corresponding to the pattern p is one (1), or is equal or greater than two (2). As a result of this, if the shaft corresponding thereto is one (1), it is sufficient to drive that shaft. On the other hand, if there exist plural candidates for that driver shaft, a selection is conducted on the candidates in a block 67, so as to drive the corresponding shaft being selected as a result thereof. At the end, at least the number of occurrences of the interruption process, being same to the process which carries out the sampling at this time, the pattern p obtained at this time, and the number of the driver shaft(s) are reserved or stored into an operation data recording means 86 of the above recording portion 38 in a block 68 (see the FIG. 1). However, the details of the selection will be explained by referring to FIGS. 13 and 14, hereinafter.

Figure 13:
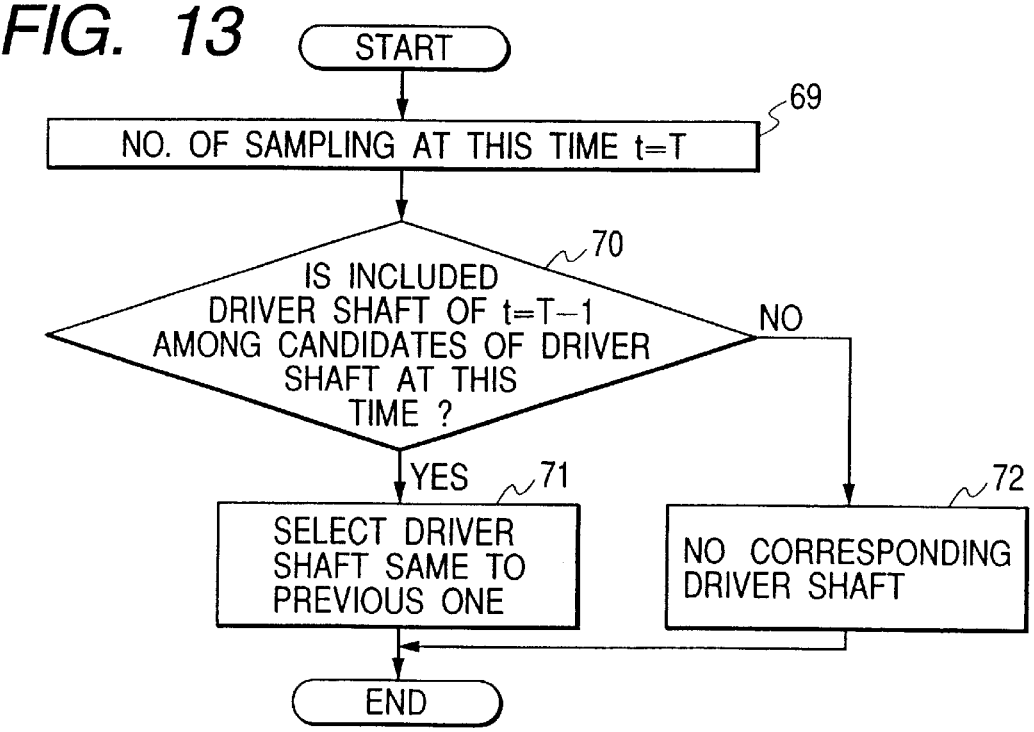
FIG. 13 is a control flow chart for showing a concrete embodiment of selection from the plural candidates of the driver shafts mentioned above.

FIG. 13 shows an example of performing the selection with priority of the shaft which was driven in the process of the interruption by one (1) time before, i.e., the last interruption process. First, in a block 69, the number of times of the samplings t=T at present is ascertained. Next, in a block 70, it is checked whether the driver shaft accompanying with the sampling one time before (i.e., the last sampling) is included in the candidates of the driver shafts at the present or not. As a result of this, if the driver shaft of the last time is included among the candidates of the driver shafts at the present time, inferring the intention of the operator by taking the driver shaft being directly close thereto into the consideration, it is decided that the driver shaft should be also driven at the present time in a block 71, being the same as that driven at the previous time. Also, if there is not existing the previous driver shaft among the driver shaft candidates, there can be avoided a danger that the shaft not intended is driven, by processing upon an assumption that there is no driver shaft corresponding thereto in a block 72.

Figure 14:
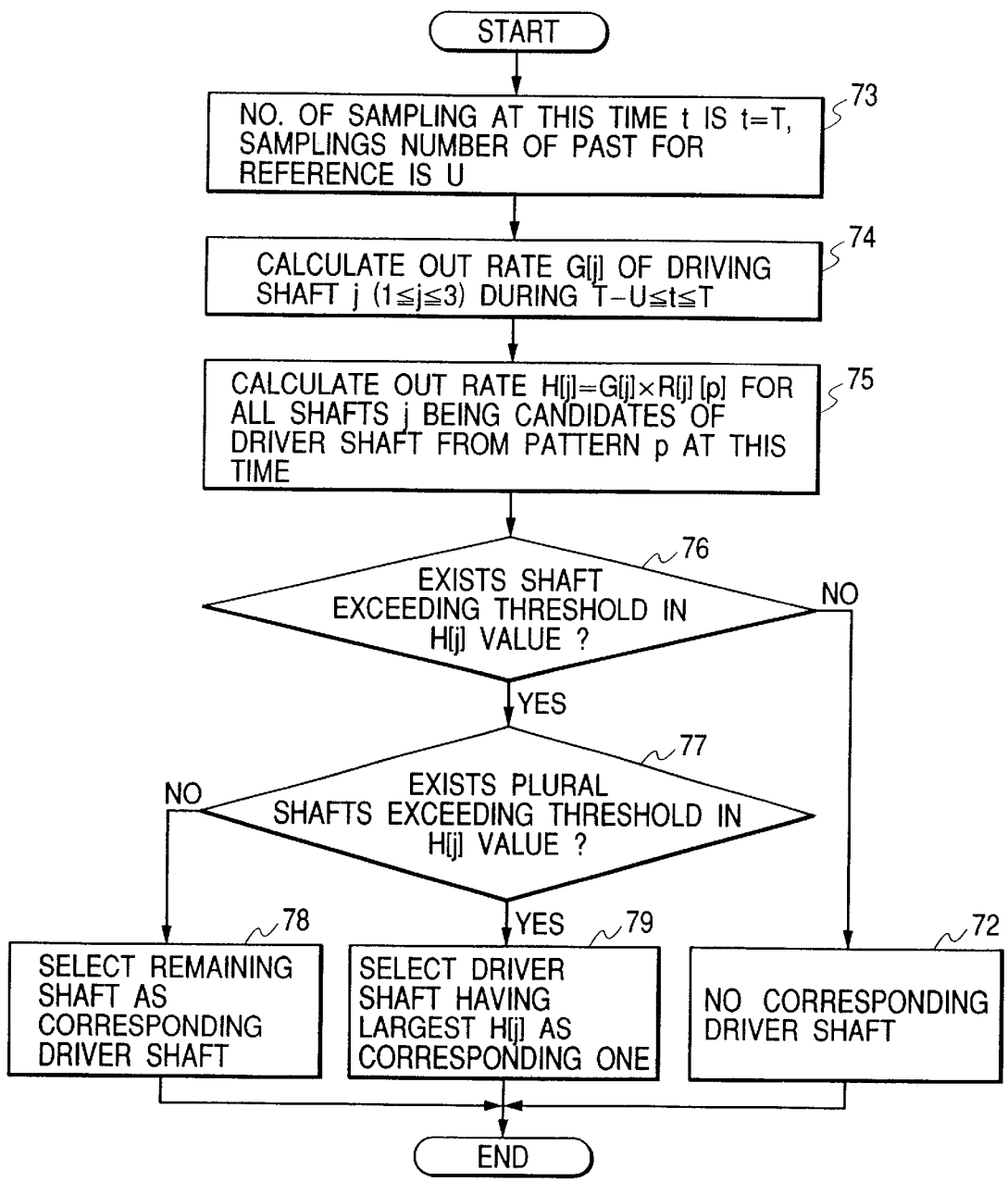
FIG. 14 is also, in same manner to the above, a control flow chart for showing a concrete embodiment of a selection from the plural candidates on the driver shafts as mentioned from the plural candidates on the driver shafts as mentioned above.

On a while, the process flow in the FIG. 14 shows an example of the selection from the plurality of candidates for the driver shaft, by taking the flow of works into the consideration, with referring to the data being obtained in the predetermined times of the interruption processes in the past. Here, also in the same manner as heretofore, explanation will be given on an assumption that the number of the driver shafts is three (3).

In the above FIG. 14, in a block 73, the number of times of the sampling t=T at the present and the number U of data in the past are ascertained. Next, in a block 74, the rate G[j] of driving the shaft j ($1 \leq j \leq 3$) in the period $T-U \leq t \leq T$ is calculated out. For example, if the number of times of driving the shaft 1 is 18 times in the total processes accompanying by the samplings of 20 times in the past, this G[j] is 0.9. Alternatively, if being unified all over the process as a whole, it can be expressed by a percentage, i.e., G[j]=90. However, in a case where there lies a condition that stoppage of the work continues during the number U of the data mentioned above, there is a possibility that the work is changed in the contents before and after the stoppage, therefore it is necessary to use only data being effective after completion of this stoppage.

Further, in the block 75, a possibility in correspondence, H[j]=G[j]×R[j][p] is calculated out for each of the driver shaft candidates. However, here j is the number of the driver shaft, and p the pattern which is produced in the sampling at the present time. Next, in a block 76, cases are divided whether there exists the shaft j which exceeds a predetermined threshold value of the above possibility in correspondence. First, if there is not, it is assumed that there is no shaft corresponding thereto in a block 72, for ensuring the safety. On the other hand, if there exists the shaft j exceeding the predetermined threshold value, further it is divided into cases depending upon whether the number of the shaft is one (1) or more than that in a block 77. Namely, if it is one (1), the shaft is decided to be the driver shaft at the present time in a block 78, while if H[j]s of the plural shafts exceed the threshold value, the shaft of the largest H[j] may be driven in a block 79.

From those processes, it is possible to execute the patterning process by using the decision table having a plurality of driver shaft candidates therein. Also, by referring to the past data, and also by referring to the possibilities of occurring the respective patterns, it is possible to remove ill-influences of the force patterns occurring accidentally due to influence of noises, etc., for example, thereby to reflect the intention of the operator, correctly or accurately, without preventing the flow of work.

Figure 15:
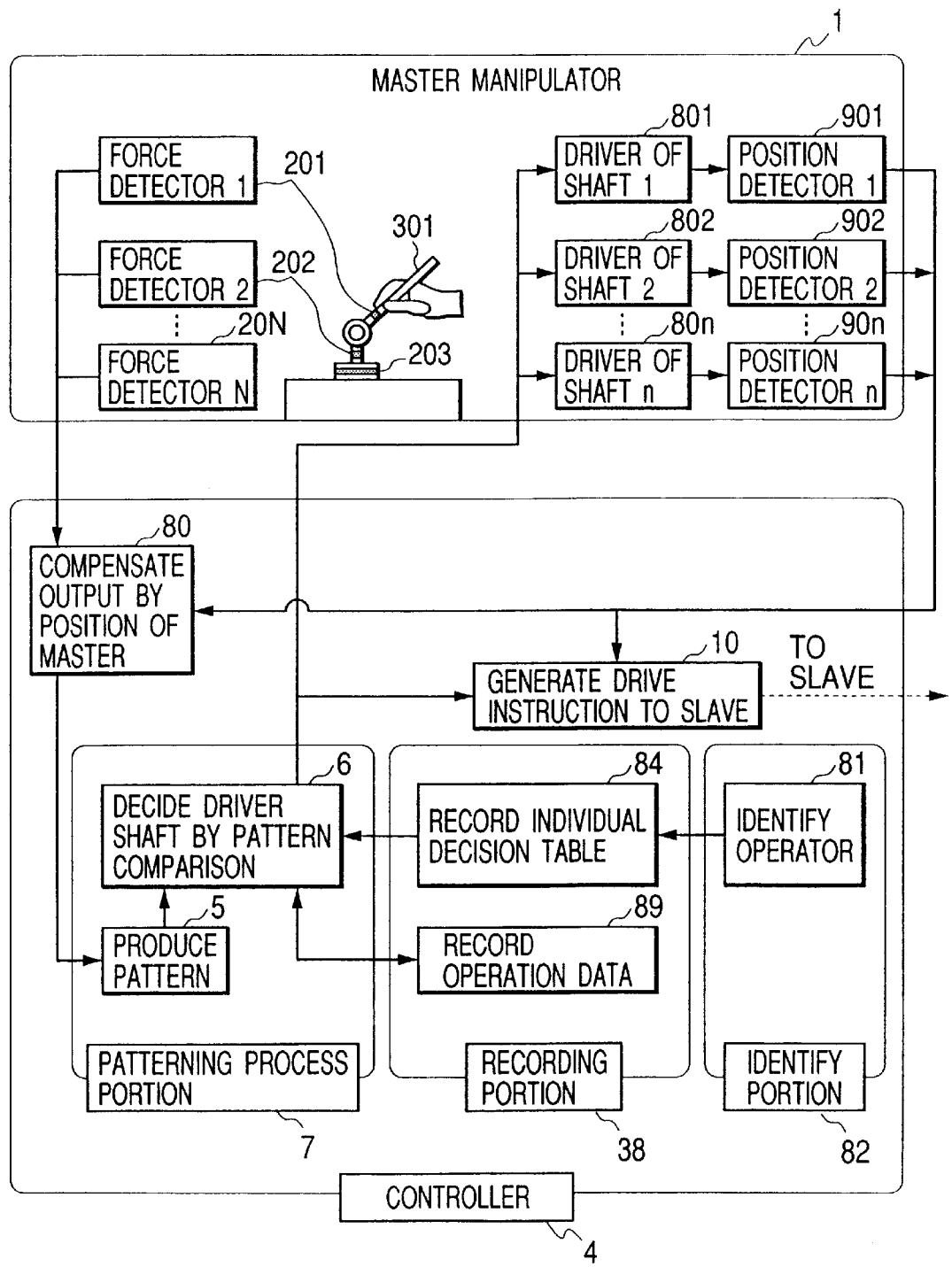
FIG. 15 is a view for showing an example of detailed construction of a controller for compensating or correcting an off-set in force detection, etc., due to an individual difference in the operation and/or due to an individual difference in the body of the master itself.

Further, FIG. 15 shows an embodiment for reflecting differences in a relative relationship between the operator and the master, etc., upon the decision table. This is by taking into the consideration the fact, when a plurality of the operators use even the same master, depending upon the operator, all of them do not always apply the forces in the totally same manner. Namely, there may be occasionally a delicate difference in the patterns of operation forces, due to differences such as in their dominant arm and habits in ways of their operations. Then, with the embodiment of the following construction, such the differences of the individuals can be compensated for each.

First, in the FIG. 15, before starting the operation, an identification of the operator is conducted by means of an operator identification means 81. For example, the personal name may be inputed through the keys, or may be read out from a magnetic recording medium in which the personal data are recorded. Also, it is possible to utilize a physical feature with which the individual can be identified, such as a fingerprint. Here, in a case where the operator is identified to be a person who operates first time, the decision table may be produced according to the method shown in the above FIG. 8, so as to be registered as the user, newly.

Continuing, after being identified the operator, the decision table of the operator as an individual, which is stored in an individual decision table recording means 84 of the recording portion 38, is read out, so as to decide the driver shaft by comparing it to the sampled pattern in the driver shaft decision means 6 for pattern comparison.

In this manner, with the embodiment mentioned above with use of the individual decision table, the decision table being reflected with the habits and/or the difference in the dominant arm of each of the operators can be utilized, therefore it is possible to input the operation with reflecting the intention of the operator thereto, correctly or accurately much more. Also, with using the means for identifying the individual, it is possible to protect from using the decision tables being fitted to other operator, erroneously.

However, even by the same operator, when using a plurality of masters being different, the operation forces being obtained may be different in the pattern thereof depending upon the individual differences of each master, such as in hardness of the driver shafts, and in sensitivities of the force detectors, etc. Also, a difference may occurs in the direction of the force applied to the master, depending upon the difference in a positional relationship between the operator and the master. This is, for example, when the operator stands at her/his position and must operate the masters being positioned at the right-hand side and the left-hand side of the dominant arm of the operator, respectively. In such the case, since a human's shoulder has such construction that a rotating movement is made around a join of shoulder, therefore, under such the condition of unconsciousness, also a movement around the shoulder join may occur occasionally, in addition to the movement which is intended. Therefore, a difference may occur in the operation forces being applied to those masters. Then, for compensating such the difference, it is preferable for the operator to make the user registration to all the masters which she/he will use, and also to produce her/his own decision table for each the master. Namely, according to this, the individual difference of the master and/or the difference in the way of applying forces due to the positional relationships between the operator and master can be compensated, thereby enabling to further reduce the possibility that the operation being different from the operator's intention is performed.

Also, further by operating the master, the position of the master is changed, and accompanying therewith off-sets enter in the signals outputted from the force detectors. For example, as is shown in the above FIG. 15, in the master in which the force detectors 201 to 20N are attached in the vicinity of the rotation center, a difference occurs in the outputs of the force detectors 201 to 20N due to it's own weight of the link, in particular, between the time when the link 301 is positioned to direct into a vertical direction and when it is so directed that it intersects with a vertical line at right angle. In this manner, depending upon the structure of the master, there may occur the case where such the off-sets due to it's own weight of the driver shaft, such as the link, cannot be neglected.

Therefore, with the embodiment shown in the above FIG. 15, the values of outputs from position detectors 901, 902 . . . 90n of the driver shafts are transferred to a drive instruction generation means 10 for generating the drive instruction to the slave, and at the same time, further also to an output compensation means 80 by means of the position of the master. In this output compensation means 80 by means of the position of the master is executed a process for removing from the position of each shaft, the off-set which may be caused by the change of position of the master and be contained in each output of the respective force detectors. Thereafter, the signals being removed with the off-sets therefrom are transmitted to the pattern generating means 5. From this, such the outputs of the force detectors above-mentioned, being generated by changing the position of the master, can be compensated, thereby enabling the operation reflecting the operator's intention correctly or accurately.

Figure 16:
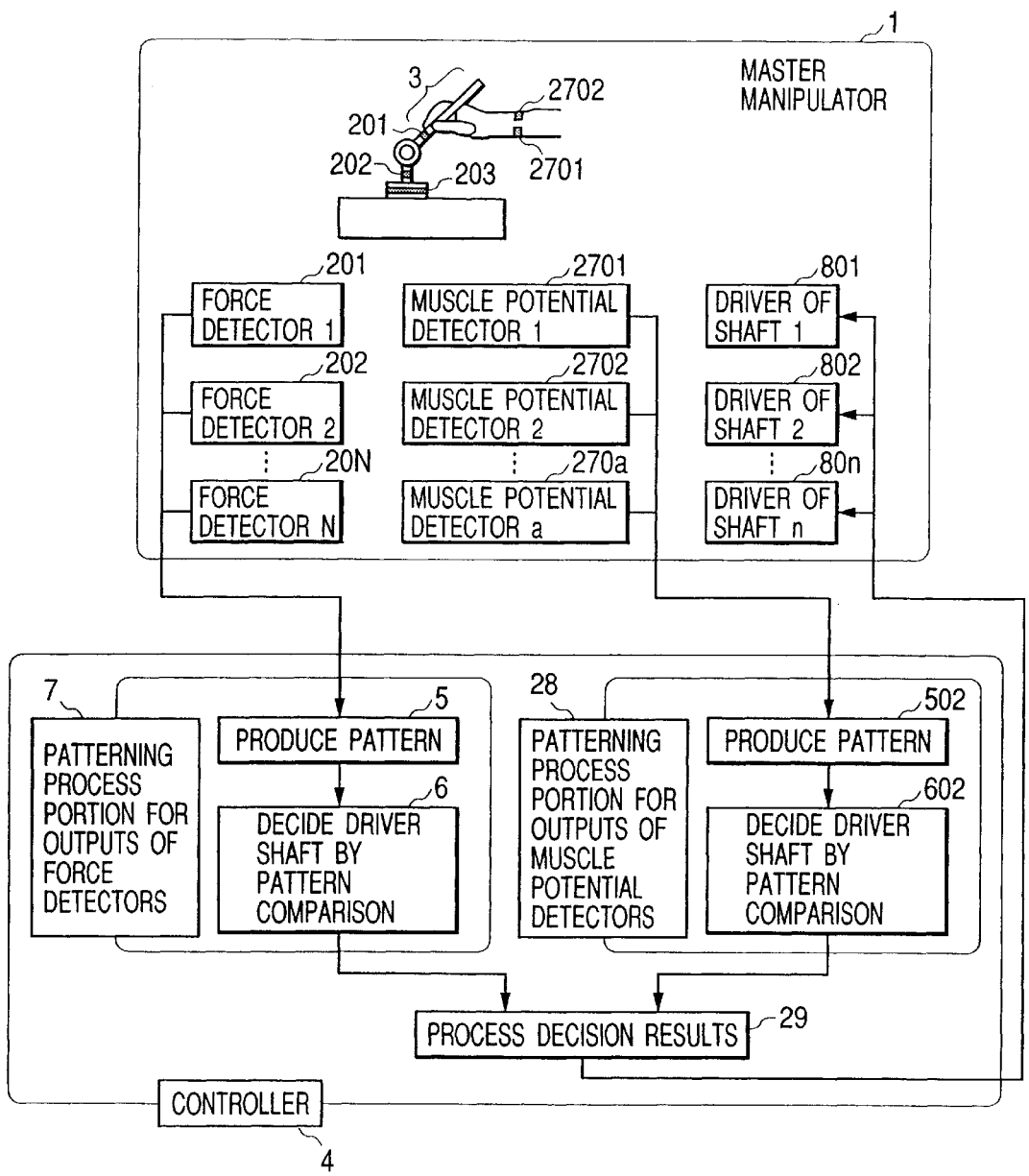
FIG. 16 is a view for showing the construction of the master-slave manipulator, wherein both the patterning process with outputs of force detector means and the patterning process with outputs of muscle potential detector means are applied together, according to the further other embodiment of the present invention.

At last, in FIG. 16 is shown an embodiment for controlling the manipulator, wherein not only the pattern of outputs of the force detectors mentioned above, but also an output pattern of a muscle electric potential measuring sensors being provided on an arm of the operator, together.

In this embodiment, being apparent from the FIG. 16, there are further provided, other than the construction shown in the above FIG. 1, muscle potential detectors 2701, 2702 . . . 270a, being attached onto an arm of a human, i.e., the operator for detecting changes in muscle electric potentials thereof, and a patterning process portion 28 constructed by a means 502 for producing a pattern from the outputs obtained from those plural muscle potential detectors, a means 602 for comparing the pattern produced by the above pattern producing means 502 with a pattern of muscle potentials which is also recorded in advance, thereby to decide the driver shaft being indicated by the muscle potentials, and a decision result processing means 29 which compares the driver shaft decided by the detection of the muscle potentials and the driver shaft decided by the output of the force detectors mentioned above, thereby to decide the driver shaft to be driven actually.

However, a method for producing the pattern from the outputs of the above muscle potential detectors 2701, 2702 . . . 270a, may be one, being same to the method for producing the pattern from outputs of the force detectors, as was mentioned in the embodiment shown in the above FIG. 1. However, it is needless to say that the decision table for bringing about a relationship between the pattern and the driver shaft must be prepared, separate from the decision table in the case of using the above force detectors.

In the embodiment using the muscle potentials, there are conducted the following processes.

First, a pattern is produced from outputs of the force detectors 201 to 20N, and the pattern produced is compared with the pattern which is recorded in advance, thereby to decide the driver shaft from the operation forces. On a while, at the same time, the outputs of muscle potentials on the arm of the operator are detected, at the same timing of detecting the operation forces mentioned above, from the muscle potential detectors 2701, 2702 . . . 270a, and a pattern is produced from the detected output of muscle potentials, in the same manner as the processing of the above operation forces. Namely, this muscle potential pattern produced is compared with the muscle potential pattern being recorded in advance, so as to decide the driver shaft, too.

Next, by means of the decision result processing means 29, the driver shaft being decided from the operation forces detected by the force detector means and the driver shaft being decided from the muscle potentials mentioned above, are compared to each other, thereby to decide the shaft to be driven actually. Further, an example of the processes conducted in the decision result processing means 29 will be explained, hereinafter.

Further, here it is assumed that, if the driver shaft being decided from the operation forces detected by the force detectors is coincident with the driver shaft being decided from the above muscle potentials, the driver shaft being indicated by both of them should be driven. Also, if a plurality of candidates can be listed up at least from one of both patterns of operation forces detected by the force detectors and of the above muscle potentials, only the driver shaft being coincident with in both of the candidates should be driven. For example, when the shaft 1 and shaft 3 are listed up as candidates from the operation forces, while the shaft 1 and the shaft 2 from the muscle potentials, then the shaft 1 being coincident with in both is decided to be driven. However, if no coincident shaft is contained in both the candidates for the driver shaft from the operation forces and the muscle potentials, any one of the shafts should not be driven.

With such the embodiment, it is possible to reflect the operator's intention, more correctly or accurately. Also, in a case where the operator tries to start the operation or stop it, the muscle potentials mentioned above react responding to it, in quicker than detecting it as the result of the forces being applied by means of the operation portion 3. Therefore, by referring to this pattern of muscle potentials, it is also possible to stop the operation at the instance when the operator intends to stop, in particular when she/he tries to stop, irrespective of the fact that a force is applied to the operation portion due to inertia thereof.

Also, with applying the result of the patterning process from the muscle potentials as the means for selecting when the plural driver shafts are listed up as the candidates, it is possible to grasp the operator's intention, much more quickly and correctly.

Further, a certain driver shaft is decided to be driven in the decision by the patterning process from operation forces, however, in the decision made by the patterning process from the muscle potentials, there can be expected a case where no driver shaft is to be driven, and in such the case, there can be expected an external force from something, such as an object. Then, in the above-mentioned embodiment, no shaft is driven in such the occasion, thereby enabling to rise up the safety, much higher.

However here, explanation was given on the example, in which the means utilizing the output of muscle potentials mentioned above is applied as the decision means, being used together with the pattern obtained from the operation forces mentioned above, however, according to the present invention, not restricting only to such the embodiments, it is also possible to use other ones together with the decision of the driver shaft made by the patterning process of the operation forces, in the same manner, as far as it is a means for grasping the operator's intention.

Also, in the explanations of all the embodiments mentioned above, it is so explained that the control is generated by every preset time as an interruption, as one example thereof, however it is apparent that the presence of time management does not matter with, as far as the process is performed periodically.

Also, in the explanations of all the embodiments mentioned above, it does not matter even if each of the elements constructing the controller may be dispersed into a several of apparatuses for executing calculation processes and/or recording apparatuses, as far as information can be transferred to one another. For example, the evaluation portion 36 in the FIG. 5, since having no relationship with the direct control of the master manipulator, may be positioned in another calculation apparatus, separated from the controller apparatus, in which the patterning process portion and the recording portion are located. Rather, by positioning the evaluation portion in the other calculation process apparatuses, the controller including the patterning process portion and the recording portion therein can devote itself only to controlling of manipulator, therefore it is much more effective from a view point of the control.

Further, with an other example, it also does not matter that the identifying portion 82 in the FIG. 15 may be prepared or provided with a special apparatus for identifying the operator, and so constructed that information is transmittable with the controller including the patterning process portion and the recording portion therein. In this case, it also does not matter that apparatuses being available on market may be connected, as an apparatus for comparing the fingerprint, etc.

In a further other embodiment, it also does not matter that the recording portion, being described in the FIGS. 1, 5, 8 and 15, may not be constructed in the same controller as the patterning process portion, but may be constructed by using a separated external recording apparatus of being transmittable with information.

Further, within the various embodiments, the details of which are mentioned in the above, in particular, with one comprising: a means for specifying a driver shaft, from which a pattern of operation forces is collected; a means for recording the pattern being generated when operating the driver shaft specified by said specifying means; a means for obtaining a relationship between the pattern generated and the driver shaft at that time, respectively, for all of the driver shafts, from said patterns recorded and data of said driver shaft being specified when recording the pattern; and a means for storing the relationships between said patterns and the driver shafts, wherein it is possible to produce the decision table in which is recorded a relationship between the pattern of operation forces applied by each operator and the driver shaft, thereby enabling for every operator to perform the operation, reflecting intention by her/himself, correctly or accurately.

Also, in particular, with the embodiment having a means for identifying the operator, wherein the relationship between the pattern of operation forces applied by the operator being identified and the driver shaft is read out from the means for storing the relationship between the pattern of the operation forces and the driver shaft therein, and the pattern which is recorded in the relationship being read out is compared with the pattern with the pattern produced from the outputs of the above force detector means, thereby deciding the operation of the slave, it is possible to make operation of the master-slave manipulator apparatus with reflecting the operator's intention, correctly or accurately, fitting to each an individual of the operators.

As is apparent from the detailed explanation given in the above, according to the master-slave manipulator apparatus and the control method therefor, wherein a plurality of force detector means for detecting operation forces are provided in the master, said controller portion produces a pattern of the operation forces inputted, from the outputs of said force detector means, and the operation of the slave, i.e., the driver shaft is determined, namely by comparing said pattern produced and the pattern recorded in advance, on the basis of this pattern produced, thereby outputting an operation instruction to the slave, it is possible to remove the forces which the operator applies unconsciously onto the master, so as to prevent from performing the movement which the operator does not intend, as well as to reflect the operator's intention on the movement of the slave, correctly or accurately.

Also, with the master-slave manipulator apparatus and the control method therefor, according to the present invention, wherein a means is provided for calculating out the force being necessary for the operation which is decided in the above and also the direction of the force being applied unconsciously, so as to evaluate a ratio of occurring such the force applied unconsciously and the direction thereof, and further is provided a means for displaying contents of the evaluation outputted from said evaluation means, at least by means of either one of letters or graphics, or alternatively with provision of a means for alarming the operator by means of a sound, being changed at least in one of timber, voice, tone and volume thereof, etc., depending upon contents of the evaluation, it is possible to make a training for reducing the force being applied unconsciously, thereby to acquire or learn a method or manner for inputting operation to transmit the operator's will by her/himself with clarity, in an actual operation of the manipulator.

While we have shown and described several embodiments in accordance with out invention, it should be understood that disclosed embodiments are susceptible of changes and modifications without departing from the scope of the invention. Therefore, we do not intend to be bound by the details shown and described herein but intent to cover all such changes and modifications falling within the ambit of the appended claims.

What is claimed is:

1. A master-slave manipulator apparatus comprising:
   a master manipulator for performing an operation input;
   a controller for processing the operation input from the master manipulator; and
   a slave manipulator operating based on a drive instruction from the controller;
   wherein the master manipulator includes a plurality of force detector means for detecting the operation input; and
   wherein the controller includes means for removing an operation input which is generated unconsciously in inputting the operation input to the master manipulator based on outputs from the plurality of force detector means.

2. A master-slave manipulator apparatus according to claim 1, wherein the unconscious operation input removing means includes:
   means for producing a generation pattern of the outputs from the plurality of force detector means of the master manipulator; and
   means for outputting the drive instruction at least to the slave manipulator, being removed from the operation input which is generated unconsciously, based on the generation pattern of the outputs from the force detector means produced by the means.

3. A master-slave manipulator apparatus according to claim 2, wherein the unconscious operation input removing means further includes deciding means for deciding a driver shaft in the slave manipulator based on the generation pattern of the outputs from the force detector means produced by the means.

4. A master-slave manipulator apparatus according to claim 3, wherein the deciding means includes:
   memory means for memorizing a generation pattern of the outputs from the plurality of force detector means therein in advance; and
   comparing means, wherein at least the driver shaft in the slave manipulator is decided through the comparing means, by comparing the generation pattern of the outputs from the plurality of force detector means with the generation pattern which is stored in the memory means.

5. A master-slave manipulator apparatus according to claim 4, wherein the generation pattern producing means further comprises means for simplifying the outputs from the plurality of force detector means.

6. A master-slave manipulator apparatus according to claim 4, wherein the decision means further comprises means for collecting the generation pattern of the outputs from the plurality of force detector means corresponding to the driver shaft specified, so as to store it into the memory means.

7. A master-slave manipulator apparatus according to claim 4, wherein the decision means further comprises identifying means for identifying the operator, and the comparison means compares the generation pattern stored in the memory means to the generation pattern of the outputs from the plurality of force detector means, corresponding to an output of the identifying means.

8. A master-slave manipulator apparatus according to claim 1, further comprising a plurality of means for detecting muscle potentials from an arm of the operator operating the master manipulator;
   wherein the controller further includes means for removing an inputting operation being generated unconsciously in the operation input of the master manipulator based on the outputs of the plurality of force detector means, and the outputs from the plurality of muscle potential detecting means as well.

9. A control method for a master-slave manipulator apparatus, wherein a slave manipulator is driven and controlled corresponding to an operation input from a master manipulator, and the master manipulator includes a plurality of force detector means, the control method comprising the steps of:
   detecting forces being applied onto the master manipulator by means of the plurality of force detector means;
   producing a generation pattern of the plural forces applied to the master manipulator, being detected in the detecting step; and
   removing an operation input applied unconsciously onto the master manipulator based on the generation pattern being produced.

10. A control method for a master-slave manipulator apparatus according to claim 9, wherein at least the operation input applied unconsciously is removed therefrom by deciding the driver shaft in the slave manipulator based on the generation pattern produced.

11. A control method for a master-slave manipulator apparatus according to claim 9, wherein at least the driver shaft in the slave manipulator is decided by comparing the generation pattern produced with a pattern produced in advance.

12. A control method for a master-slave manipulator apparatus according to claim 11, wherein the comparison with the pattern produced in advance is conducted after simplifying the generation pattern produced.

13. A control method for a master-slave manipulator apparatus according to claim 9, wherein there are further provided a plurality of means for detecting muscle potentials from an arm of an operator operating the master manipulator, and the operation input applied to the master manipulator unconsciously is removed by using also outputs from the plurality of the muscle potential detector means, when excluding the operation input applied to the master manipulator unconsciously.

14. An apparatus for making a training of operating a master-slave manipulator apparatus, wherein a slave manipulator is driven and controlled corresponding to an operation input from a master manipulator, comprising:

a controller for processing the operation input from the master manipulator;

wherein the master manipulator forming a training apparatus for operation input of the manipulator includes a plurality of force detector means for detecting the operation input; and wherein the controller includes means for deciding presence of the operation input being applied by an operator unconsciously in the operation input of the master manipulator based on outputs from the plurality of force detector means;

wherein the training of the master-slave manipulator apparatus is conducted based on the presence of the unconscious operation input which is decided by means of the decision means.

15. An apparatus for making a training of operating a master-slave manipulator apparatus according to claim 14, further comprising means for generating an alarm depending on a result of decision by means of the decision means of the unconscious input operation.

16. An apparatus for making a training of operating a master-slave manipulator apparatus according to claim 14, further comprising a display means for displaying a result of decision by means of the decision means of the unconscious input operation.

17. An apparatus for making a training of operating a master-slave manipulator apparatus according to claim 14, further comprising identifying means for identifying the operator.

18. A method for making a training of operating a master-slave manipulator apparatus, wherein a slave manipulator is driven and controlled corresponding to an operation input from a master manipulator, and the master manipulator includes a plurality of force detector means for detecting the operation input, the method comprising the steps of:

detecting forces applied onto the master manipulator by means of the plurality of force detector means;

producing a generation pattern of the plural forces applied onto the master manipulator, which are detected in the above step;

deciding a presence of an operation input being applied unconsciously by an operator in the operation input of the master manipulator; and conducting the training for the operation input of the manipulator based on the existence of the unconscious operation input by the operator, which is decided.

19. A method for making a training of operating a master-slave manipulator apparatus according to claim 18, further comprising the step of alarming the operator based on the existence of the unconscious operation input by the operator, which is decided.

20. A method for making a training of operating a master-slave manipulator apparatus according to claim 18, further comprising the step of displaying a result of the decision based on the existence of the unconscious operation input by the operator, which is decided.

* * * * *